(12) United States Patent
Day et al.

(10) Patent No.: US 6,740,381 B2
(45) Date of Patent: May 25, 2004

(54) FIBER REINFORCED COMPOSITE CORES AND PANELS

(75) Inventors: Stephen W. Day, Dayton, OH (US); Daniel M. Hutcheson, Bellbrook, OH (US); G. Scott Campbell, Dayton, OH (US)

(73) Assignee: Webcore Technologies, Inc., Centerville, OH (US)

( * ) Notice: Subject to any disclaimer, the term of this patent is extended or adjusted under 35 U.S.C. 154(b) by 0 days.

(21) Appl. No.: 09/749,064

(22) Filed: Dec. 27, 2000

(65) Prior Publication Data

US 2001/0031350 A1 Oct. 18, 2001

Related U.S. Application Data

(60) Provisional application No. 60/173,265, filed on Dec. 28, 1999, and provisional application No. 60/235,292, filed on Sep. 26, 2000.

(51) Int. Cl.⁷ .............................. B32B 3/10; B32B 3/18
(52) U.S. Cl. .................. 428/56; 428/316.6; 428/309.9; 428/317.9; 428/86; 428/74; 428/318.6; 52/782.1; 52/790.1; 52/794.1
(58) Field of Search ................... 428/317.9, 314.4, 428/311.11, 311.51, 86, 56, 74, 316.6

(56) References Cited

U.S. PATENT DOCUMENTS

| | | | |
|---|---|---|---|
| 3,339,326 A | 9/1967 | Derr et al. | |
| 3,544,417 A | 12/1970 | Corzine | |
| 3,567,541 A | 3/1971 | Kaczerginski | |
| 4,196,251 A | * 4/1980 | Windecker | .................. 428/311 |
| 4,223,053 A | 9/1980 | Brogan | |
| 4,380,253 A | * 4/1983 | Mead et al. | ................. 138/149 |
| 4,411,939 A | 10/1983 | Hawkins et al. | |
| 4,617,217 A | 10/1986 | Michaud-Soret | |
| 5,108,810 A | 4/1992 | Williams | |
| 5,197,928 A | * 3/1993 | Mishima et al. | ............. 474/263 |
| 5,721,034 A | 2/1998 | Seemann, III et al. | |
| 5,741,574 A | * 4/1998 | Boyce et al. | ................ 428/119 |
| 5,834,082 A | * 11/1998 | Day | ............................ 428/56 |
| 5,904,972 A | 5/1999 | Tunis, III et al. | |
| 5,958,325 A | 9/1999 | Seemann, III et al. | |
| 6,159,414 A | 12/2000 | Tunis, III et al. | |

FOREIGN PATENT DOCUMENTS

| | | |
|---|---|---|
| DE | 2236479 | 2/1974 |
| EP | 0 293 612 | * 12/1988 |
| EP | 0672805 B1 | 3/1994 |
| GB | 2 253 588 | 9/1992 |

OTHER PUBLICATIONS

Translation of EP 672 805, Maquet, Sep. 1995.*

* cited by examiner

*Primary Examiner*—Terrel Morris
*Assistant Examiner*—Hai Vo
(74) *Attorney, Agent, or Firm*—Jacox, Meckstroth & Jenkins

(57) ABSTRACT

A fiber reinforced core is formed from plastics foam material having elongated porous and fibrous webs and/or rovings extending through the foam material. The rovings may extend angularly through the webs, and strips of the foam material may be helically wound with layers of crossing rovings to form the webs. Porous and fibrous skins for the core may be formed by the wound rovings and by parallel continuous rovings, and the foam strips may be formed with internal grooves adjacent the webs and connected by a feeder channel for infusing a hardenable adhesive resin into the grooves and outwardly through the webs to the skins with differential pressure on the resin.

50 Claims, 10 Drawing Sheets

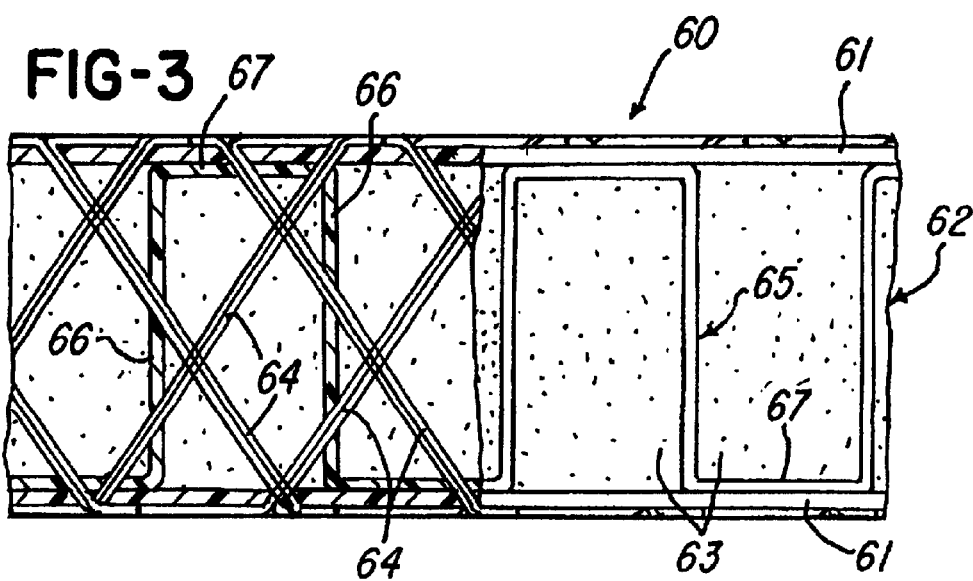
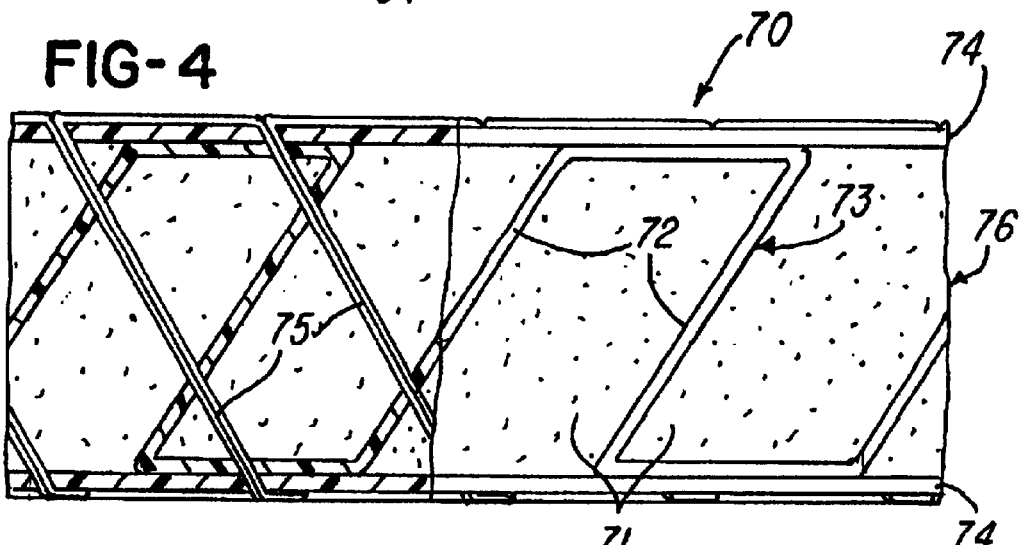
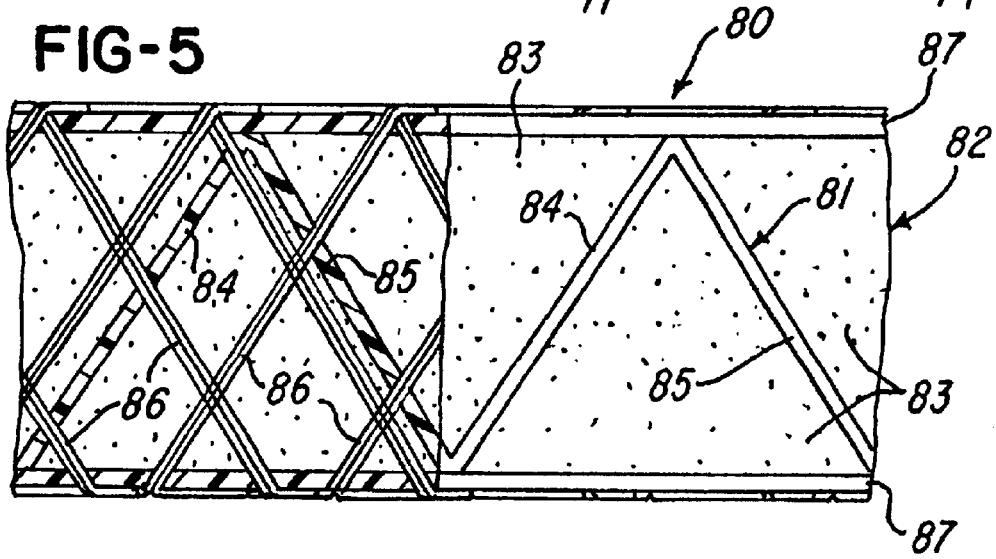

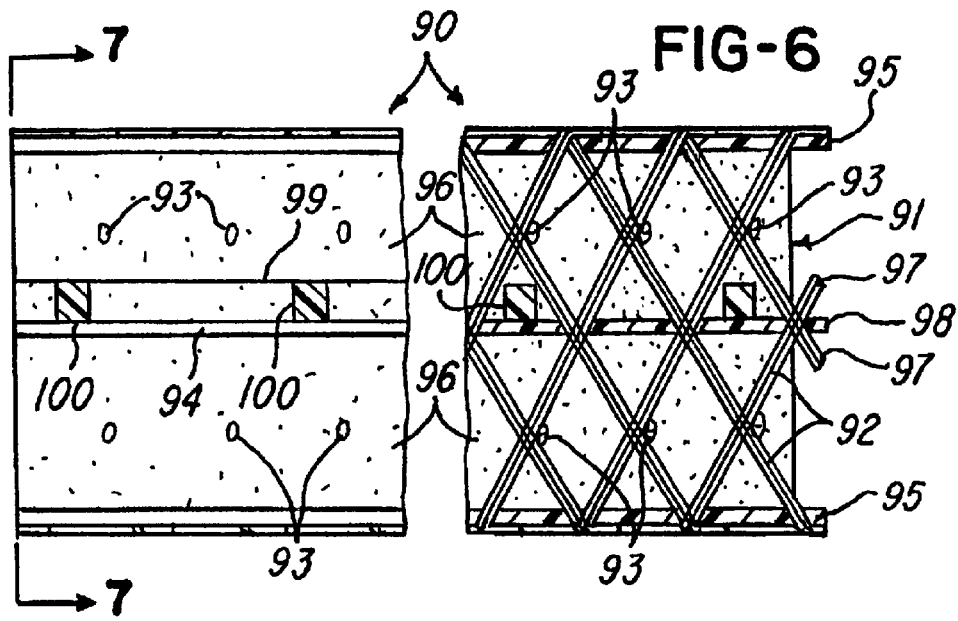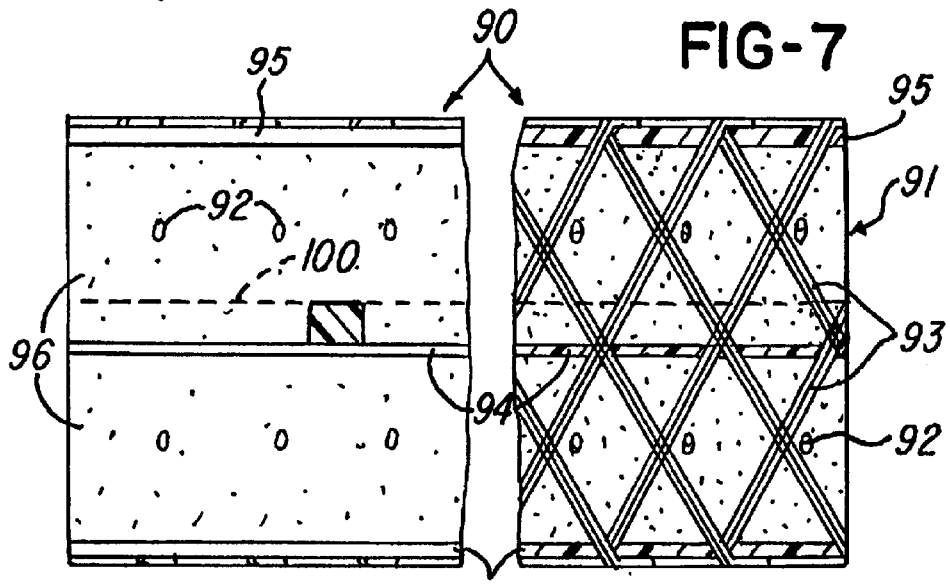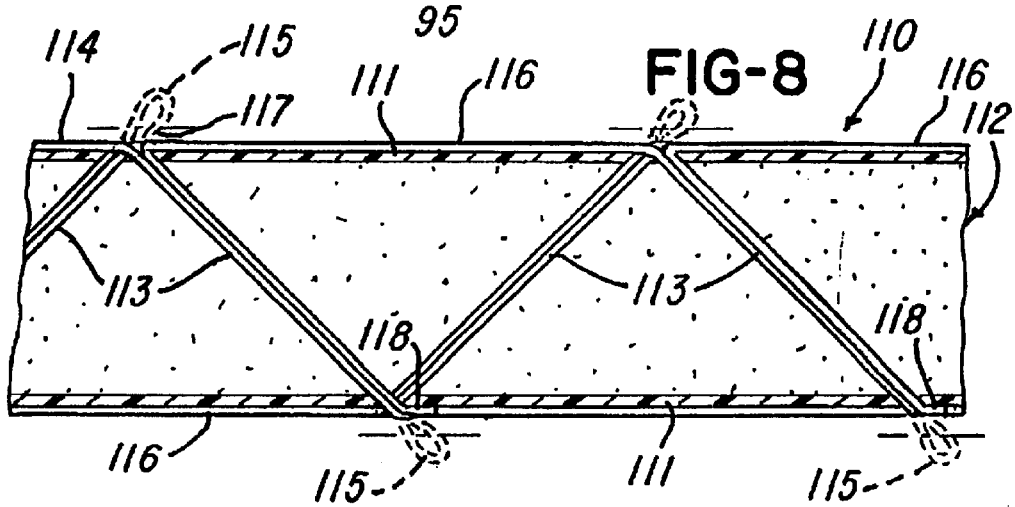

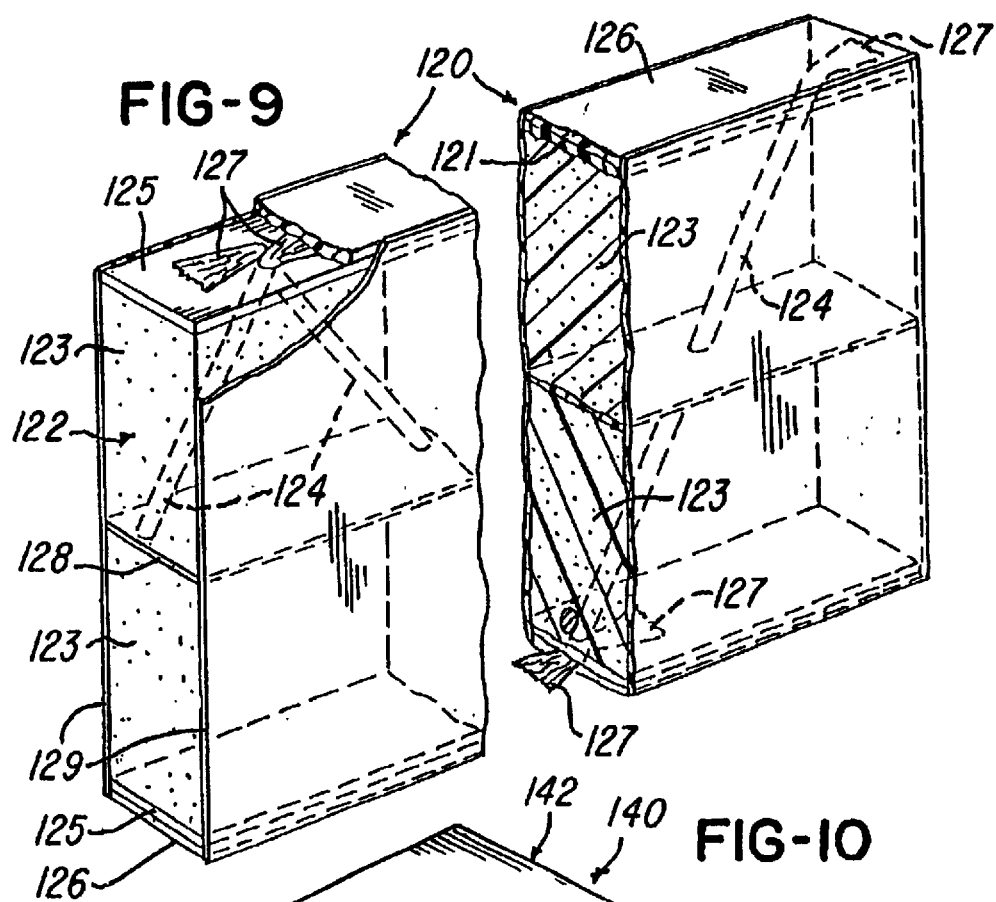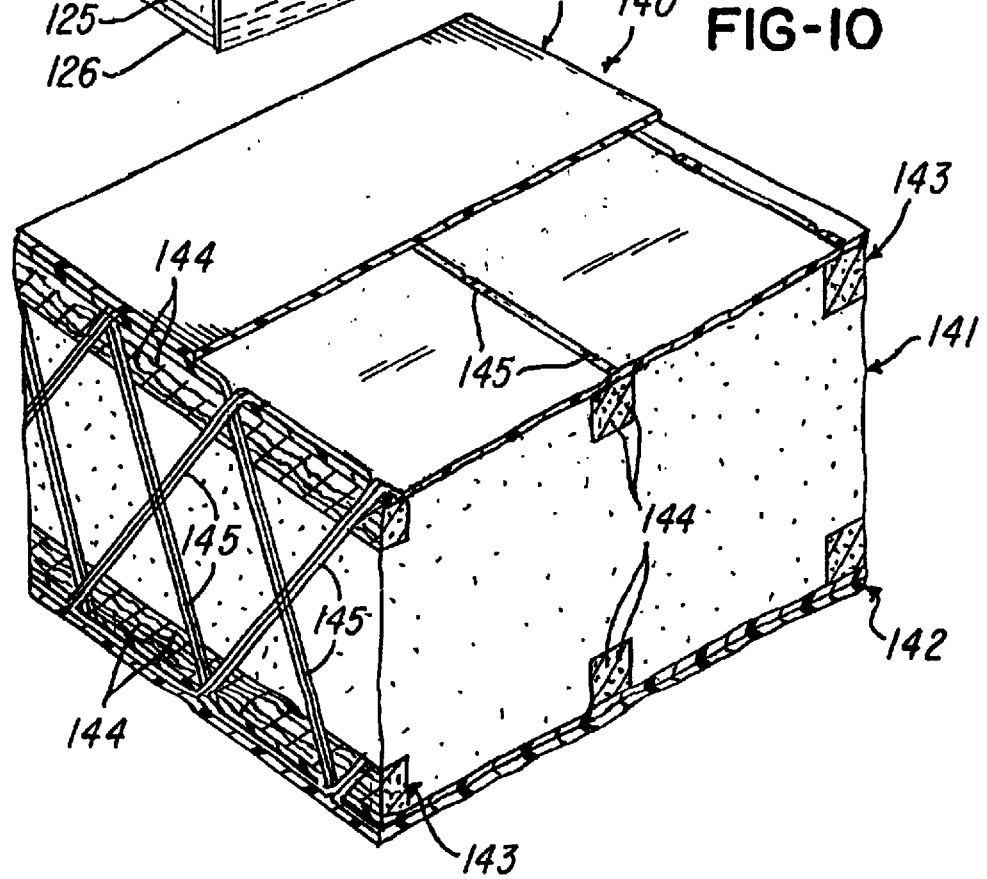

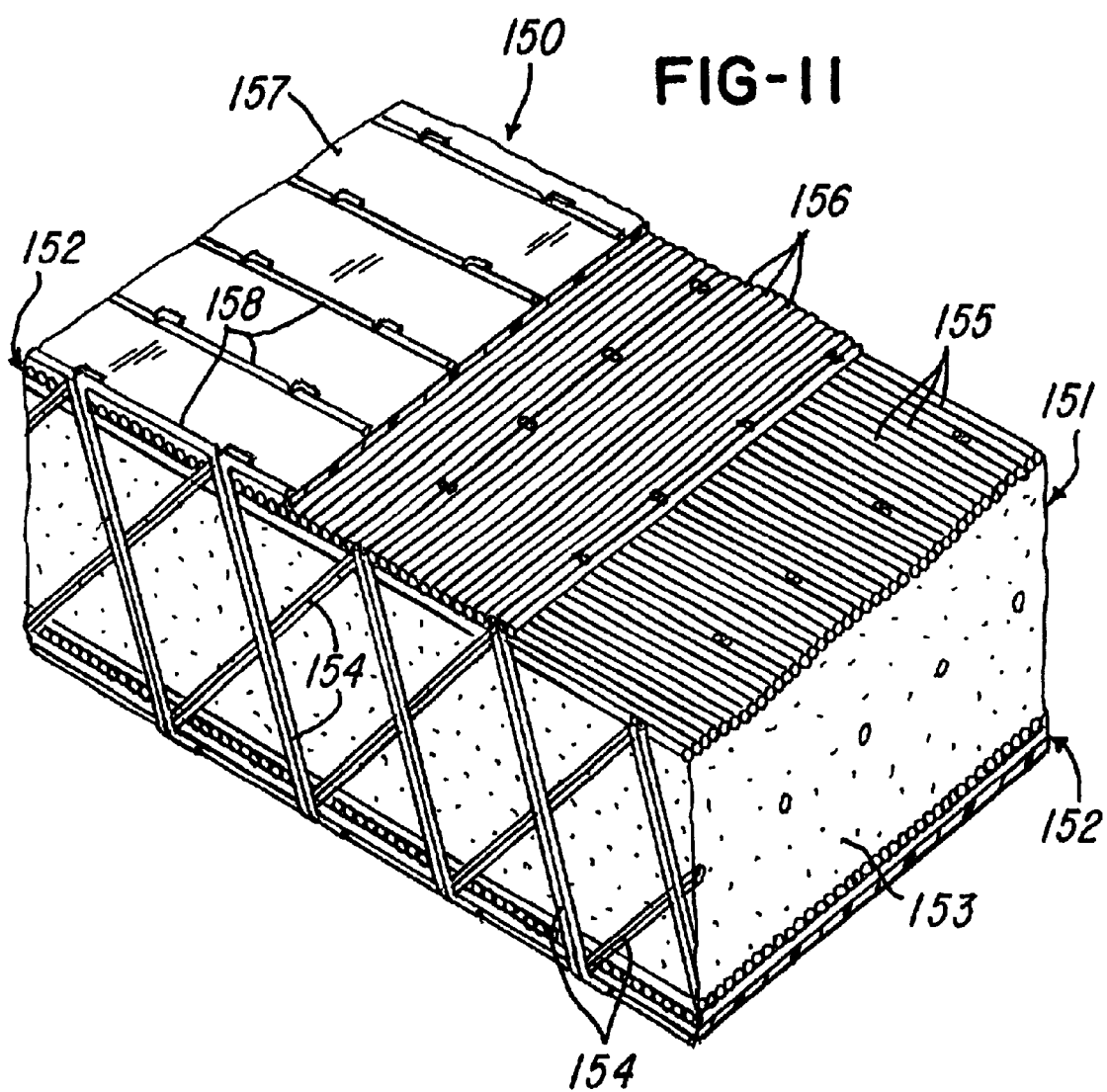

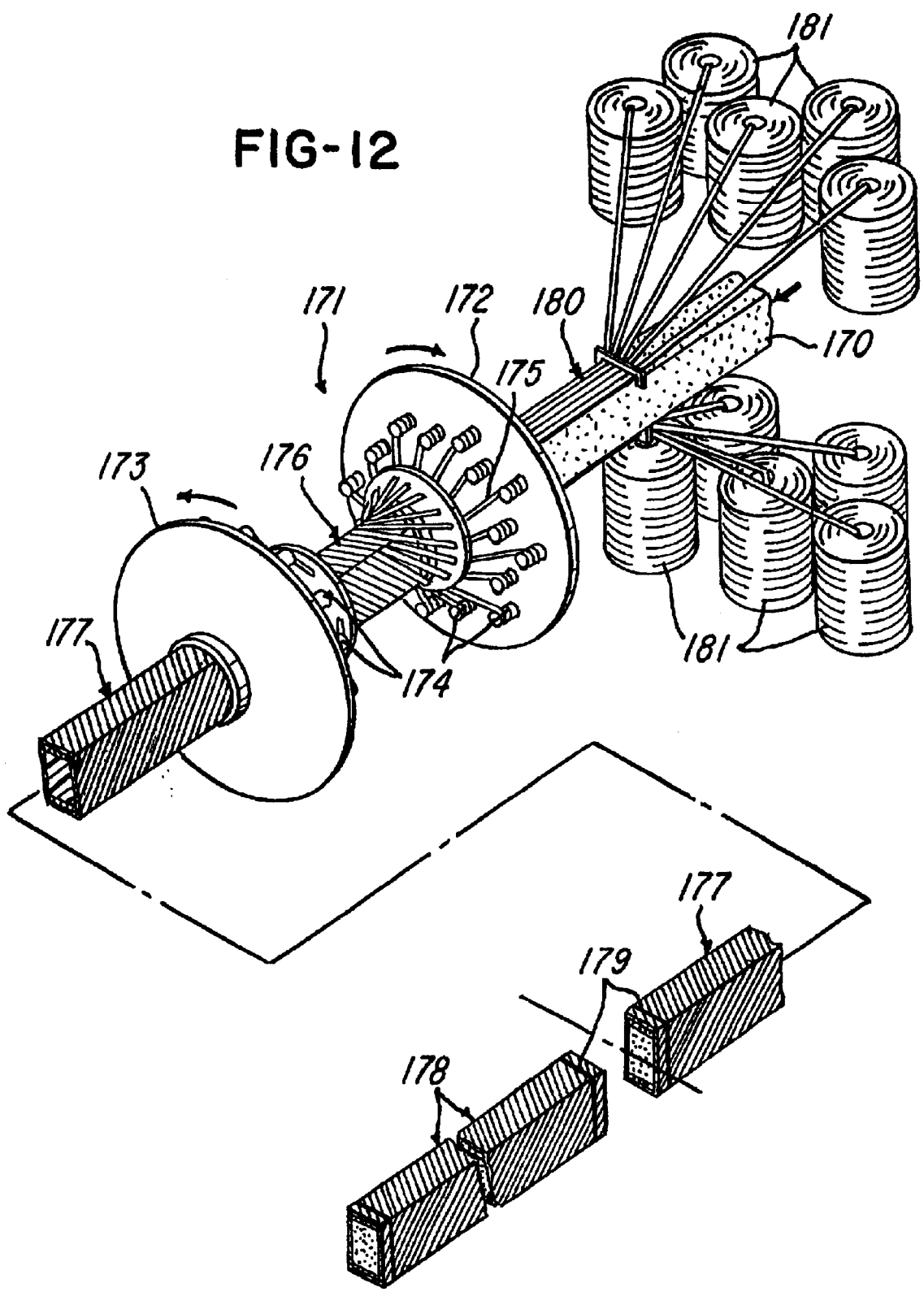

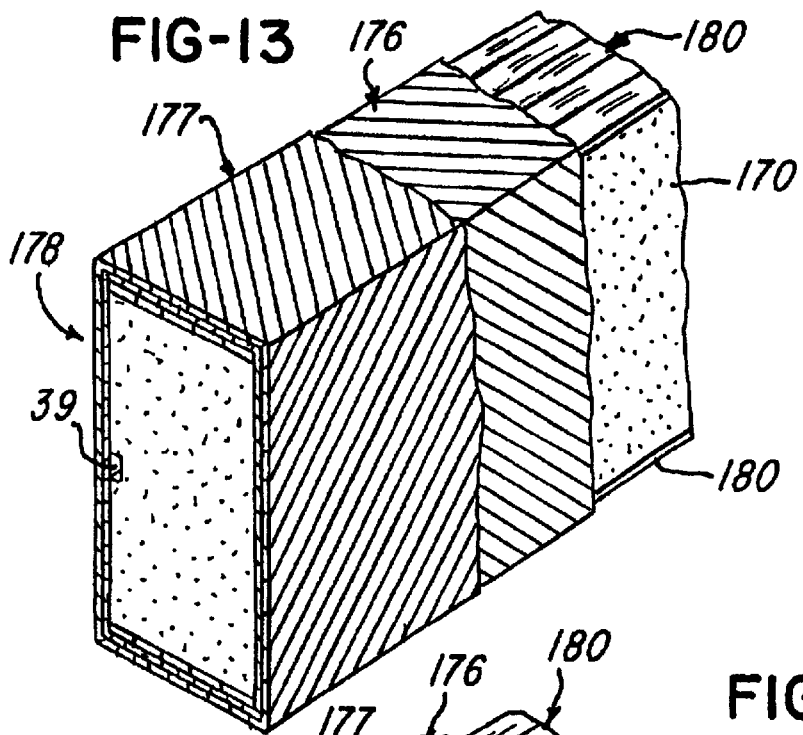
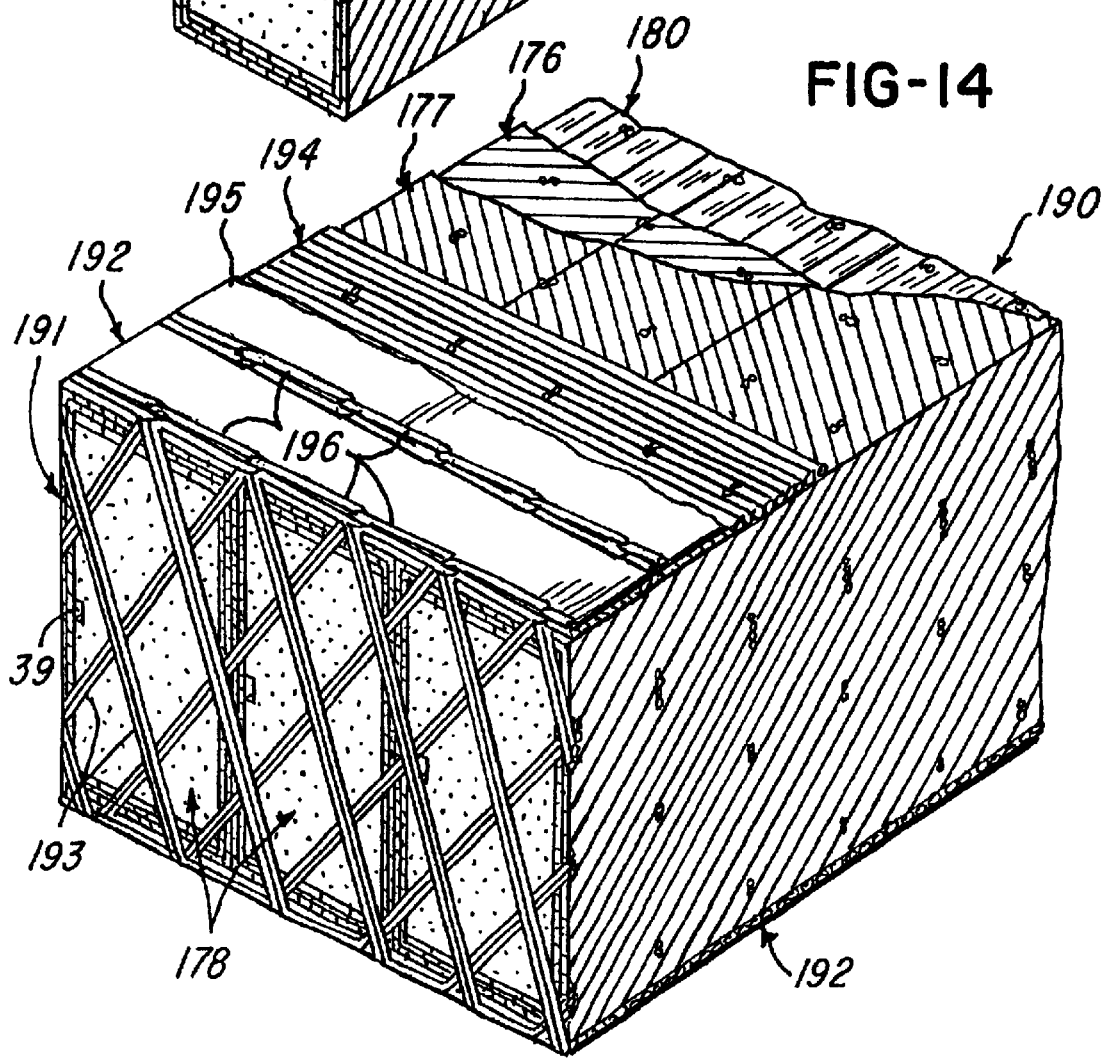

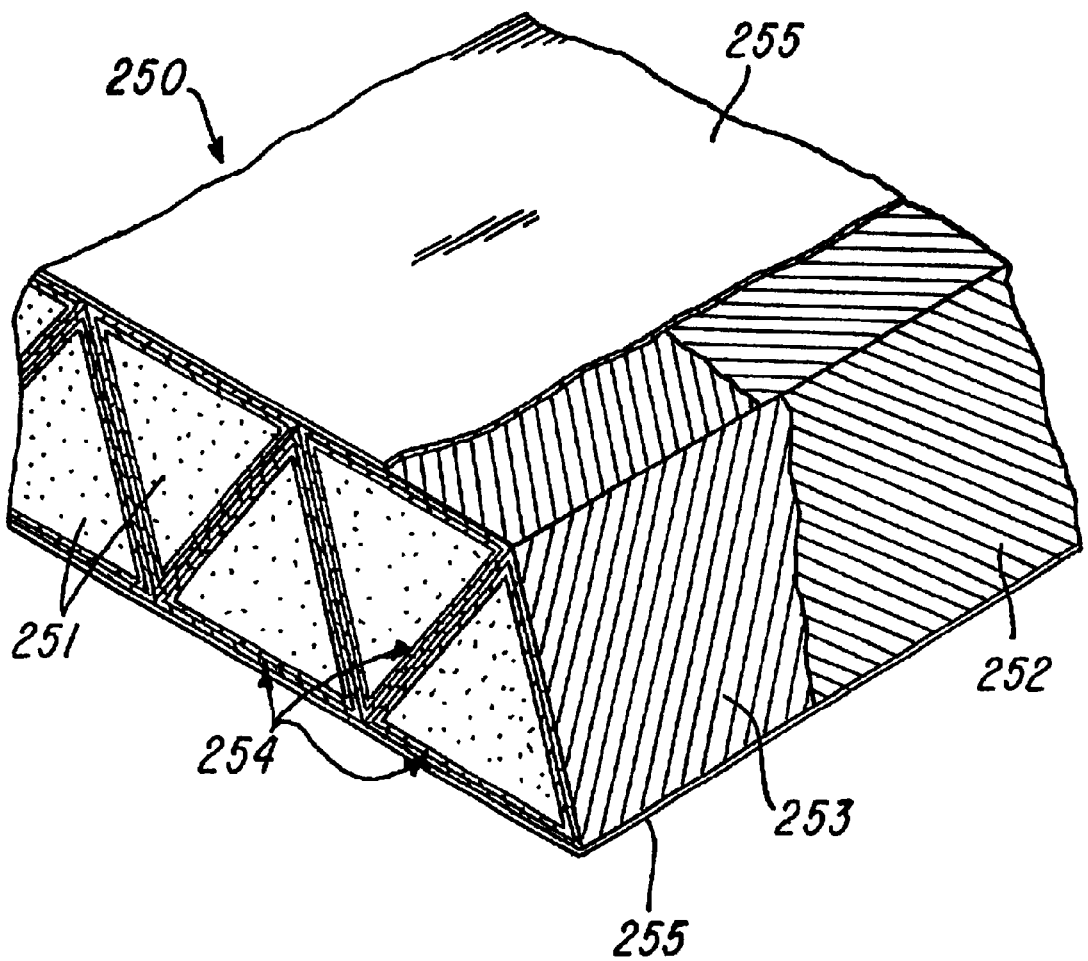

FIBER REINFORCED COMPOSITE CORES AND PANELS

RELATED APPLICATIONS

This application claims the benefit of Provisional Applications Ser. No. 60/173,265, filed Dec. 28, 1999 and Ser. No. 60/235,292, filed Sep. 26, 2000.

U.S. GOVERNMENT RIGHTS

This invention was made with U.S. Government support under US Air Force Contract No. F29601-02-C-0169 and under Contracts F33615-99-C-3217, F33615-00-C-3018 and US Navy Contract N00167-99-C-0042. The Federal Government has certain rights in the invention.

FIELD OF THE INVENTION

This invention relates to sandwich panel composite structures comprising fiber reinforced low density closed cell material, fibrous skin reinforcements and resin, and in particular to improved structural configurations, improved methods of resin infusion and methods of production.

BACKGROUND OF THE INVENTION

Structural sandwich panels having cores comprised of low density closed cell material, such as plastic closed cell foam, and opposing skins comprised of fibrous reinforcing mats or fabrics in a matrix of cured resin have been used for many decades in the construction of a wide variety of products, for example, boat hulls and refrigerated trailers. The foam core serves to separate and stabilize the structural skins, resist shear and compressive loads, and provide thermal insulation.

The structural performance of sandwich panels having foam cores may be markedly enhanced by providing a structure of fibrous reinforcing members within the foam core to both strengthen the core and improve attachment of the core to the panel skins, for example, as disclosed in Applicant's U.S. Pat. No. 5,834,082. When porous and fibrous reinforcements are introduced into the closed cell foam core and a porous and fibrous skin reinforcing fabric or mat is applied to each face of the core, adhesive resin, such as polyester, vinyl ester or epoxy, may be flowed throughout all of the porous skin and core reinforcements by differential pressure, for example under a vacuum bag. While impregnating the fibrous reinforcements, resin does not saturate the plastic foam core because of its closed cell composition. The resin then co-cures throughout the reinforced structure to provide a strong monolithic panel.

It is desirable to produce sandwich panels of enhanced structural performance by improving the structural connections and support among reinforcing members within the foam core and between the core and the panel skins. This is desirable in order to resist buckling loads in the reinforcing members, to prevent premature detachment of reinforcing members from one another and from the skins under load, and to provide multiple load paths for the distribution of forces applied to the panel.

Existing fiber reinforced core products offer important improvements over unreinforced foam in this regard but fail to integrate fully the separate reinforcing elements of the core into a unified and internally supported structure. For example, in a grid-like configuration of fibrous reinforcing sheet-type webs in which a first set of continuous webs is intersected by a second set of interrupted or discontinuous webs, the webs do support each other against buckling. Thus, under severe loading conditions, the discontinuous webs tend to fail at the adhesive resin bond to the continuous webs along their narrow line of intersection. This tendency may be substantially reduced by providing resin filled fillet grooves in the foam along the lines of intersection as disclosed in the above mentioned patent. However, since the reinforcing fibers of interrupted webs terminate at each intersection with a continuous web, the structural contribution of those fibers is substantially less than that of the fibers of the continuous webs.

In the case of strut or rod type core reinforcements comprising rovings of fiberglass or carbon fiber or other fibers which extend between the faces of the core, individual struts within a given row of struts may intersect each other in a lattice configuration. This supplies buckling support to each strut, but only in the plane of the strut row. To achieve bidirectional support, struts of a first row must extend through the filaments of struts of an intersecting row. This requires difficult and costly levels of accuracy and control in machine processing, since all struts must be precisely positioned in three dimensions.

SUMMARY OF THE INVENTION

One embodiment of the present invention overcomes the limitations of both web type and strut type reinforced foam cores by combining these two types of reinforcing elements into hybrid reinforcement configurations. In hybrid architecture the foam core is provided with parallel spaced rows of fibrous reinforcing webs or sheets which extend between the faces of the foam board at an acute or right angle. A second set of parallel spaced rows of reinforcing elements comprising rod-like fibrous rovings or struts also extend between the faces of the foam board at acute or right angles, and the rovings or struts intersect the webs and extend through them. Thus webs and struts constitute an interlocking three dimensional support structure in which all reinforcing fibers within the core are uninterrupted. The interconnected webs and struts provide multiple load paths to distribute normal loads efficiently among the reinforcing elements of the core and between the core structure and the panel skins. Impact damage tends to be limited to the immediate area of impact, since the complex reinforcement structure resists the development of shear planes within the core.

In an alternate hybrid architecture, the webs comprise a continuous sheet of fabric or mat which is formed into corrugations having segments which extend between the faces of the core, and the voids between the corrugations are filled with foam strips of matching cross-section. The corrugations, together with the intersecting panel skins, may form, in cross-section, rectangles, triangles, parallelograms or other geometric shapes which are structurally efficient or which offer manufacturing advantages.

In a particularly cost efficient version of hybrid core, the core reinforcing webs are produced by winding relatively low cost fibrous rovings in a helical manner onto rectangular foam strips, rather than by adhering substantially more expensive woven or stitched fabric to the surface of the foam strips. Additional rovings may be applied axially along the length of the strips during the winding operation to enhance structural properties of the strips or to serve as low cost components of the finished panel skins. The fiber-wound foam strips may also be attached together to form a structural core without the addition of rows of structural struts. In this configuration, the contiguous or adjacent sides of wound strips of rectangular cross section form web elements having I-beam flanges for attachment to panel skins. In contrast to the disclosure of U.S. Pat. No. 4,411,939, the fibrous extensions of each core web are attached to panel skins on both sides of the web rather than only one, greatly increasing the shear strength of the resulting panel. This permits the use of lighter and less expensive webs for a given strength requirement. Similarly, the present invention provides markedly improved core-to-skin attachment and shear strength when compared to the structure disclosed in Applicant's U.S. Pat. Nos. 5,462,623, 5,589,243 and 5,834,082. In tests, webs comprised of circumferentially wound rovings exhibit 75% greater shear strength than those whose end portions terminate adjacent the panel skins. Each wound strip may be provided with internal transverse reinforcing webs to provide bi-directional strength and stiffness. Roving-wound cores may also be formed using strips of triangular cross section.

The winding of rovings by machine and the consolidation of the fiber-wound strips into a single core have both economic and handling advantages. It is common for a single composite bridge deck panel or yacht hull constructed in accordance with U. S. Pat. No. 5,701,234, 5,904,972 or 5,958,325 to comprise a thousand or more individual core blocks. The labor component of producing these individual cores is very high. Reinforcement fabric is cut into sheets which are wrapped and glued around each separate core, or smaller pieces of fabric are glued to the separate faces of each core, or tubular fabrics are first formed and the cores inserted into them. These processes become increasingly difficult as the dimensions of the core components decrease. Arrangement of these cores in a mold is also labor intensive, expensive and time consuming, which restricts the number of panels which may be produced from a mold in a given period of time. Positioning of individual core blocks becomes increasingly awkward as the curvature of the mold increases or as the mold surface departs from horizontal. The cores which are the subject of the present invention substantially eliminate these deficiencies by unitizing a large number of components into a single, easily handled core.

In addition to their superior structural performance, hybrid design allows economical production of extremely complex and structurally efficient configurations through relatively simple processes at high machine throughput and without requiring extreme levels of manufacturing precision. As mentioned above, bidirectional strut type cores require the insertion of roving reinforcements into the foam board with a degree of accuracy which is difficult to achieve when it is desired that rovings of intersecting rows extend through one another. It is also necessary to make multiple passes through strut insertion devices in order to place struts angled in two to four directions within the board.

In contrast, bidirectional hybrid cores may be produced in as little as a single pass through a strut insertion device. The reinforcement webs cooperate with the intersecting struts to resist loads in the plane of the struts. The webs also provide strength in the direction transverse to the struts, since the webs extend transversely to the rows of struts. Further, a much more limited degree of accuracy is required in production, since the struts have only to intersect the plane of the webs, rather than a narrow bundle of filaments.

Hybrid cores improve production of molded panels by increasing the rate and reliability of resin impregnation or infusion of both the core reinforcing elements and the sandwich panel skins which overlie the core. In vacuum assisted resin transfer molding (VARTM) processes, panels comprising dry and porous skin reinforcements are placed in a closed mold or a single sided mold in which the panel is covered by a sealed bag impermeable to air. The panel is then evacuated, and resin under atmospheric pressure is allowed to flow into and infuse the reinforcements. Because of the complex interconnections between the webs and struts in the cores of the present invention, both air and resin are able to flow rapidly and pervasively throughout the structure. The porous webs and struts form natural resin flow paths between the skins and carry resin rapidly from its source of introduction to a multiplicity of points at the porous skins. This minimizes the problem of race tracking, in which areas of dry skin fabric become isolated from the vacuum source by an unevenly advancing resin front, preventing the skins to wet out fully before the resin begins to thicken and cure.

In one embodiment of the present invention, no resin distribution medium of any kind is required between the panel skins and the mold surface or vacuum bag membrane. This not only eliminates the cost of such distribution medium but also allows the production of panels having smooth faces on all sides. Also, in contrast with prior art such as disclosed in U.S. Pat. No. 5,958,325, the foam core need not be provided with micro grooves located on the periphery of the core adjacent the panel skins, or with slots or holes in the foam which extend between the skins, as the means for distributing resin to the skins. In the present invention, all resin flows to the skins through the core reinforcing structure, whereas U.S. Pat. No. 5,958,325 specifically describes impregnation as resulting from resin infusion originating at the core surface. A disadvantage of peripheral micro grooves is that the size and spacing of the micro grooves must be selected to match the type and quantity of the panel's fibrous fabrics in order to insure full impregnation of the skin and core reinforcements before the resin cures. In the present invention, all of the resin which infuses the skins passes through the porous reinforcing structure of the core to reach the skins, and since panel skins are typically intersected by two or more porous reinforcing elements per square inch of panel surface, resin tends to spread both rapidly and evenly across the skin surface. Thorough impregnation of the panel skins, which can be seen, is a reliable indicator that the core reinforcing structure does not have dry, and therefore weak areas. This is an important advantage over other infusion systems, in which resin is introduced adjacent the skins.

In accordance with the present invention, resin is supplied to the core reinforcing structure through a network of grooves within the interior of the foam core and adjacent the core reinforcing webs and extending parallel to the webs, and not adjacent the panel skins. The ends of these grooves intersect feeder channels which usually have a larger cross-sectional area. Resin supplied to the feeder channels rapidly flows through the grooves adjacent the webs and substantially all of the resin then flows through the fibrous core reinforcing elements to reach and impregnate the panel skins. If the resin grooves are located in a plane near the center of the panel thickness, resin need only flow through half the thickness of the panel, in each direction from the center plane, before full resin saturation is achieved. This is markedly faster than common resin infusion techniques in which resin is introduced across a single panel face and must flow through the entire panel thickness to reach and infuse the opposing face. Panels with thick cores or thick skins may be provided with one or more additional sets of resin grooves and feeder channels for faster infusion. The sets of grooves and feeder channels describe a plurality of planes parallel to the panel faces.

The infusion method of the present invention is particularly well suited for the production of molded panels in which both faces of the panel require a superior surface finish. Because resin is introduced into the interior of the core and flows rapidly under differential pressure throughout the core to the skin reinforcing structure, both faces of the panel may be adjacent rigid mold surfaces of desired shape and finish, without seriously increasing the time required for infusion compared to infusion conducted under a flexible surface, such as a vacuum bag. In contrast, common differential pressure molding processes such as VARTM, in which the skin reinforcements are consolidated by pressure prior to the introduction of resin, require that one side of the panel be covered with a flexible membrane, such as a vacuum bag, enclosing a resin distribution medium if it is desired to both maintain substantial pressure and introduce resin rapidly over the skin surface. If this arrangement is not used, the pressure of rigid mold surfaces against both panel faces necessitates a long and slow infusion path, in which the resin impregnates the skins by flowing along their length and width, rather than through their thickness.

The inside-out core infusion method of the invention may be used to infuse into the fibrous core reinforcements and inner skin layers a resin which differs in properties from the resin which infuses the outer skin layers of the panel. It may be used, for example, to produce a sandwich panel having an outer skin layer comprising fire resistant phenolic resin and an inner skin layer and core reinforcement structure comprising structural vinyl ester resin. This is achieved by providing an adhesive barrier, for example of epoxy resin in film form, between inner and outer layers of porous, fibrous skin reinforcements. A first resin is supplied by infusion from within the core as previously described, and a second resin is infused directly into the outer skin reinforcements, with the barrier film serving to keep the resins separate while creating a structural adhesive bond between them.

In a useful variation of the hybrid core of the invention, the reinforcing webs do not extend between the faces of the panel. Instead, two or more foam boards are interleaved with porous, fibrous web sheets and stacked in a sandwich configuration. Porous roving struts or rods extend between the faces of the core and through the intermediate web sheet or sheets. The web or webs stabilize the struts against buckling under load and also serve to distribute resin to the struts and skins. Resin may be introduced through parallel spaced grooves in the foam adjacent the web. Alternately, resin may be flowed into the core through a feeder channel which is perpendicular to the panel faces and which terminates in radial grooves adjacent the webs. This arrangement is useful in infusing circular panels, for example, manhole covers. In a third variation, the web sheet may incorporate low density fibrous mat or non-structural, porous infusion medium through which resin supplied through feeder channels flows across the center plane of the panel to the struts and through the struts to the panel skins.

An additional feature of the present invention is the provision of improved connections between strut or rod-type core reinforcing elements and sandwich panel skins. This improvement is applicable to hybrid panels having both web and strut-type core reinforcing members, as well as to panels whose core reinforcing comprises only struts. The porous and fibrous struts which extend between the faces of the core may terminate between the core and the skins, may extend through the skins and terminate at their exterior surfaces, or may overlie one or more layers of the panel skins. Under load, the struts are subject to substantial forces of tension or compression at the point of intersection with the skins, and these forces may cause failure of the adhesive bond between reinforcing element and skins.

Prior art, for example, as disclosed in European Patent No. 0 672,805 B1, discloses the provision of looped end portions of the reinforcing elements adjacent the skins. Under pressure during molding, the loops formed in the end portions of the struts provide an expanded area of adhesive contact with the skins. However, a serious disadvantage of this design is that the loops, which are doubled-back bundles of fibers, form lumps which cause the panel skins to deform out of plane under molding pressure. This results in excess resin accumulation in the skins, an increase in the tendency of the skin to buckle under in-plane compressive loads, and undesirable surface finishes.

In the present invention, terminating ends of strut type reinforcing elements are cut to allow the filaments which comprise the struts to flare laterally under molding pressure, which both significantly flattens the end portions against the skins and provides an expanded area of adhesive bond between each strut end portion and skin in the region immediately adjacent the strut end portion. Skin surface flatness may be further improved by applying sufficient pressure, sometimes simultaneous with heat, to the faces of the panel before molding to provide recesses for embedding any reinforcement lumps or ridges into the foam core during the molding process. Alternately, grooves may be formed in the faces of the foam along the lines of strut insertion, into which strut end portions or overlying stitch portions are pressed during molding.

The present invention also provides an alternate method of anchoring strut ends and which is effective even when the strut end portions do not overlie panel skins. In this configuration, parallel grooves or slits are so located in the faces of the foam board that the end portions of strut-type reinforcing members pass through the grooves. Porous reinforcing rovings having sufficient depth to adhesively anchor the strut ends are inserted into the grooves prior to insertion of the strut members, and resin which flows into the structure during molding provides structural attachment of struts to the rovings within the grooves. The rovings, having a substantial area of contact with the overlying panel skins complete the transfer of structural loads between skins and cores. An important additional benefit of this construction is that the groove rovings and strut members may be sized so as to constitute a unitized truss structure, with the groove rovings serving as truss chords. Since rovings cost substantially less than woven fabrics, this allows for economical panel fabrication in cases where relatively thin skins are adequate between the truss rows.

In the present invention, low cost rovings may also be applied directly to the faces of the foam boards to form panel skins during the process of inserting reinforcing members into the foam and in lieu of applying skins of more costly woven or knitted fabric reinforcements to the faces of the core. In this method, multiple rovings are supplied along parallel lines transverse to the core length and are drawn in a longitudinal direction continuously from supply creels by the forward progress of the foam core through the strut insertion machine, in sufficient number to more or less cover the faces of the foam. Prior to strut insertion, groups of rovings are drawn transversely, at right or acute angles, across the faces of the core from creels and advance with the core while strut rovings are stitched through the core. Overlying portions of the stitches hold all surface rovings in position to form a structural panel skin once resin has been applied to the panel. If desired, a light veil of reinforcing material may be applied over the surface rovings before stitching to improve the handling characteristics of the core prior to molding. In lieu of continuous rovings, random or oriented chopped rovings may be applied between the core faces and surface veils to form a structural mat.

BRIEF DESCRIPTION OF THE DRAWINGS

FIG. 3 is a fragmentary section of another embodiment of a reinforced foam core composite panel constructed in accordance with the invention;

FIG. 4 is a fragmentary section of another embodiment of a reinforced foam core composite panel constructed in accordance with the invention;

FIG. 5 is a fragmentary section of another embodiment of a reinforced foam core composite panel constructed in accordance with the invention;

FIG. 6 is a fragmentary section of another embodiment of a reinforced foam core composite panel constructed in accordance with the invention, with a center portion broken away;

FIG. 7 is a fragmentary section taken generally on the line 7—7 of FIG. 6 and with a center portion broken away;

FIG. 8 is a fragmentary section of another embodiment of a reinforced foam core composite panel constructed in accordance with the invention;

FIG. 9 is a fragmentary perspective view of a reinforced foam core composite panel constructed in accordance with another embodiment of the invention;

FIG. 10 is a fragmentary perspective view of a reinforced foam core composite panel constructed in accordance with another embodiment of the invention;

FIG. 11 is a fragmentary perspective view of a reinforced foam core composite panel constructed in accordance with a modification of the invention;

FIG. 12 is a diagrammatic view of apparatus for producing fiber-wound foam strips in accordance with the invention;

FIG. 13 is a fragmentary perspective view of a fiber-wound foam strip constructed in accordance with the invention;

FIG. 14 is a fragmentary perspective view of a reinforced foam core composite panel constructed in accordance with the invention;

FIG. 19 is a fragmentary perspective view of another embodiment of a reinforced foam core constructed in accordance with the invention.

DESCRIPTION OF THE PREFERRED EMBODIMENTS

Figure 1:
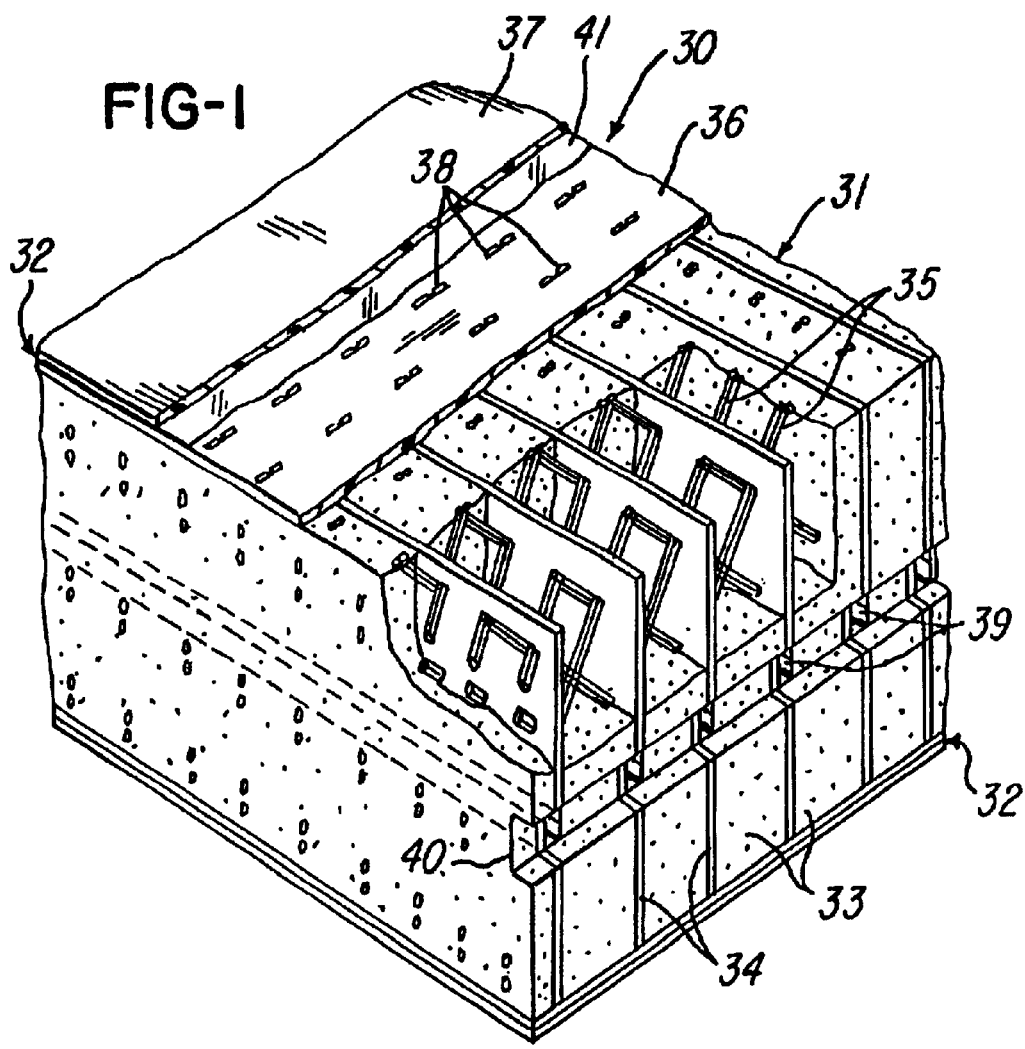
FIG. 1 is a fragmentary perspective view of a reinforced foam core composite panel constructed in accordance with the invention.

FIG. 1 illustrates a structural composite sandwich panel 30 which may be used, for example, as the floor of a highway truck cab, the hull or transom of a boat, the roof of a factory building, or as a vehicular or pedestrian bridge deck. Panel 30 comprises a fiber reinforced closed cell plastic foam core 31 and opposing fiber reinforced skins 32. Foam core 31 comprises a plurality of foam strips 33, whose structural properties are insufficient to resist loads in the core which would correspond with loads for which skins 32 are designed.

The core reinforcing fibers, which are selected to impart the required structural properties to the core, are of fiberglass or carbon fiber or other reinforcing fibers. In one direction, the reinforcing fibers comprise a plurality of parallel sheets or webs 34 of porous, fibrous fabric or mat which extend between the faces of the core 31 and which have been adhesively attached to one face of each foam strip 33 while maintaining substantial porosity in the web material. If desired, the webs 34 may incorporate reinforcements comprising a plurality of individual rovings adhesively applied to foam boards (not shown) from which strips 33 are cut. In a crossing direction, generally perpendicular to the webs 34, the core reinforcing fibers comprise a plurality of parallel rows of spaced rods or struts 35, which extend between the faces of the core and are made up of bundles or rovings of porous reinforcing filaments.

Each row of struts comprises a plurality of struts 35 inclined at opposing acute angles, for example +58 degrees and −58 degrees or +45 degrees and 45 degrees, to the panel skins. The two sets of opposing struts in each row lie in the same plane and intersect each other to form a triangulated or lattice type structure. The diameter and spacing of struts 35 within a row of struts are determined by structural considerations, but are commonly in the range of 0.01 inch to 0.12 inch diameter and 0.25 inch to 2.0 inch spacing. In some cases struts may exceed 0.50 inch diameter and 7.0 inch spacing. Rows of struts 35 are commonly spaced 0.5-in. to 1.0-in. apart.

The closed cell foam strips or pieces 33 may be of polyurethane, polyvinylchloride, polystyrene, phenolic, polyethylene, polymethacrylimide or other foam material having the desired properties for a specific application. Typically, foam density is low, in the range of 2 to 5 pounds per cubic foot, but much higher densities may be used where appropriate.

As shown in FIG. 1, the struts 35 intersect webs 34, and the fibers which comprise the struts extend through the fibers which comprise the webs. Since the fibrous rovings which comprise the struts are inserted into the foam core and through the webs in a stitching operation, the filaments which comprise the struts pass through the filaments of the webs without breaking either set of filaments, so that the continuity of all elements of the core reinforcing structure remains intact. In a preferred embodiment, panel skins 32 comprise inner skins 36 and outer skins 37. The end portions 38 of reinforcing struts 35 also extend through the inner skins 36 and flare laterally to overlie the inner skins 36. The inner skins 36 are covered by outer skins 37 prior to molding panel 30 with resin. The struts are thus mechanically attached to the skins, providing high resistance to delamination of skins 32 from core 31 under load. If desired, the end portions of strut rovings may terminate adjacent the faces of the reinforced core 31.

The porous and fibrous reinforcements of both core and skins are impregnated or infused with an adhesive resin which flows, preferably under differential pressure, throughout all of the reinforcing materials and cures to form a rigid, load bearing structure. Before panel 30 is molded and cured, inner skins 36 and foam strips 33 with their attached webs 34, are held together as a unitized structure by friction caused by pressure of the plastic foam and the skin fibers against the roving fibers which form the struts 35, as well as by the roving segments or end portions which overlie the panel skins. While the core 30 may vary widely in dimensions for specific applications, practical core sizes include, for example 0.25-in. to 5.0-in. thick and 2-ft. to 8-ft. wide×2-ft. to 40-ft. long. Cores are commonly produced in continuous lengths and cut to the desired length. To mold sandwich panels which are larger in area than a single reinforced core constructed in accordance with the present invention, two or more cores may be arranged adjacent each other in the mold prior to the introduction of resin.

Shear loads in the core 31 are resisted in one direction primarily by the struts 35 and in the transverse direction primarily by the webs 34. In addition, a complex integration of webs and struts is achieved through the rigid resin bond at each point of intersection of strut and web and through the continuity of reinforcing fibers through all such intersection points. Webs and struts support each other against buckling loads, which permits the use of lighter weight reinforcing members in thick panels, where the slenderness of the core reinforcing members makes them prone to buckling failure. The configuration shown in FIG. 1 is able to resist large compressive loads perpendicular to the skins, since the webs 34 are oriented at right angles to skins 32 and are restrained from buckling by the struts 35. The structural integration of webs and struts also provides multiple load paths to increase the sharing of localized compressive loads among the core reinforcing elements and provides substantial resistance to the initiation and spread of planes of shear failure separation within the core. Adhesive and mechanical attachment of core reinforcing members to skins provides high resistance to pull-through of fasteners in the panel skins.

The fiber reinforcements of the foam core and skins are commonly impregnated or infused with resin by flowing the resin throughout the porous reinforcing fibers under differential pressure in processes such as vacuum bag molding, resin transfer molding or vacuum assisted resin transfer molding (VARTM). In VARTM molding, the core and skins are sealed in an airtight mold commonly having one flexible mold face, and air is evacuated from the mold, which applies atmospheric pressure through the flexible face to conform panel 30 to the mold and compact the fibers of the skins 32. Catalyzed resin is drawn by the vacuum into the mold, generally through a resin distribution medium or network of channels provided on the surface of the panel, and is allowed to cure. The present invention may, if desired, incorporate an improved method of VARTM infusion.

Reinforced core 31 may be provided with resin grooves 39 machined into foam strips 33 and located adjacent webs 34 within the interior of the foam core 31. The grooves 39 terminate at a resin feeder channel 40 (FIG. 1) which is usually larger in cross sectional area than individual grooves 39, but may be of the same size. Channel 40 serves to distribute the resin under differential pressure to the grooves 39. Feeder channels 40 may be located either along one or both of the edges of the reinforced core 31 at which reinforcing webs 34 terminate. Alternately, channel 40 may be located entirely within the interior of the core. For purposes of illustration, FIG. 1 shows channel 40 at the core edge, and FIG. 7 shows the feeder channel in the core interior. If channel 40 is provided on only one edge of core 31, grooves 39 may extend to the opposing edge of core 31 or alternately may terminate within foam strip 33, depending upon the dynamics of resin flow within the reinforced foam core and panel skin reinforcements.

Catalyzed resin flows to channel 40 through a tube (not shown) connected to a resin source, commonly a drum of resin. The tube opening may be located at any point along channel 40. In a preferred method of infusing the reinforced cores of the present invention using a vacuum bag, the mold is sealed and evacuated prior to attaching any resin plumbing apparatus to the mold. A rigid resin connection or insertion tube is provided with a sharp, pointed end and is then inserted through the vacuum bag membrane and panel skins 36 and 37, or through the vacuum bag at the edges of panel 30, and into reinforced core 31, intersecting feeder channel 40. The insertion tube has been provided with openings in its circumference which permit the flow of resin into channel 40. A tape sealant is applied at the point of insertion to prevent loss of vacuum, the insertion tube is connected to the resin supply, and resin is drawn by the vacuum through the insertion tube and into channel 40.

In addition to the speed, simplicity and low material cost of this method of introducing resin into the panel, additional resin connection tubes may be inserted into the panel at other locations, while the infusion is in progress, to bring additional resin to specific areas of the panel. The tube insertion method may also be used to infuse panels 30 which are enclosed entirely within a rigid mold, by providing in a mold surface one or more holes through which resin connection tubes may be inserted. As resin fills grooves 39, it flows into and throughout the porous and fibrous webs 34, into and throughout the intersecting porous and fibrous struts 35, and into and throughout intersecting panel skins 32, after which the resin cures to form a rigid reinforced sandwich panel structure. Reinforced cores 31 which have been provided with channels 40 may be placed in a mold with channels 40 adjacent each other and forming a single, larger channel. Resin which flows into this larger channel cures to form a structural spline which is keyed into the edge portions of webs 34 and resists shear forces between the adjacent cores 31.

The resin distribution system incorporated into the reinforced core 31 has significant advantages over existing VARTM processes. Resin fills grooves 39 rapidly and flows throughout the web and strut reinforcing structure to panel skins 32 through numerous, relatively evenly distributed connections with the skins by the webs and struts, thereby minimizing the likelihood of non-impregnated areas in the skins. No resin micro grooves or distribution medium material are required on the periphery of the core 31. Resin is introduced into the plurality of grooves 39 located in the mid-plane of the panel and travels a relatively short distance to both skins 32. Vacuum may be applied at any desired location or locations on outer skins 37 or panel edge fabrics. If desired, multiple rows of perforated vacuum tubing, fibrous drain flow media or other means of introducing vacuum may be provided against the surface of outer skins 37 to ensure that small areas of dry, porous skin reinforcements are not isolated from vacuum by surrounding resin flow. Panels having unusually thick cores or skins may be provided with additional sets of resin grooves 39 and associated feeder channels 40 located in planes parallel to panel skins 32. Resin introduced into the center of the panel travels a relatively short distance to both skins 32. The internal core infusion system just described is also effective in cores comprising webs which extend between the skins without intersecting fibrous struts. Closer web spacing may be required for uniform resin distribution.

The mold surfaces in contact with the reinforced core panel may be either rigid or flexible without impairing the rapid flow of resin throughout the core reinforcing structure or skins. For example, a reinforced core with associated porous and fibrous skins may be placed between a rigid mold table and a rigid caul plate, with the caul plate covered by a vacuum bag sealed to the mold table. Evacuating the bag from one edge of the panel applies atmospheric pressure to the panel, and resin introduced at the opposing edge of the panel flows rapidly throughout the core and skin reinforcing structure, without having to flow longitudinally through the entire length or width of the panel skins as in conventional VARTM processes in which both mold faces are rigid.

Reinforced panel 30 may be constructed to permit simultaneous infusion of the core with two resins of differing properties. For example, the exterior skin of the panel may be impregnated with fire resistant phenolic resin, and the interior skin and core reinforcing structure may by impregnated with structurally superior but less fire resistant vinyl ester resin. If such a structure is desired, panel 30 is provided, prior to resin infusion, with adhesive barrier films 41 located between the inner skins 36 and outer skins 37. The barrier film 41 is comprised of adhesive material, for example epoxy, which prevents the passage of liquid resin from one side of the film to the other and which, under application of heat and moderate pressure, cures to form a structural bond between the inner skins 36 and outer skins 37.

To infuse the panel, the reinforced core 31, together with the attached inner skins 36, adhesive barrier films 41 and outer skins 37, are placed in a closed mold which is then evacuated by vacuum pump. A first resin is introduced into the interior of the core 31 through channels 40 and 39 and allowed to flow throughout the core reinforcing structure and inner skins, as previously described. Simultaneously, a second resin, of differing composition, is introduced directly into the outer skin through the mold surface or the outer skin edge. The adhesive barrier film 41 serves to prevent the mingling of the two different resins, and heat generated by the curing of the two resins also advances the cure of the adhesive film, thus providing a structural bond between the inner and outer skins. If adhesive film is applied to both sides of panel 30, three individual resins may be infused into the panel. If adhesive film 41 is applied to one side of panel 30 only, the resin which infuses core 31 will also infuse both inner and outer skins on the opposite side of the panel.

The embodiments of the present invention illustrated in FIGS. 1, 2, 6, 7, 13, 14 and 18 have been shown as provided with internal resin distribution grooves adjacent the core reinforcing webs and with an associated resin feeder channel. It is understood that this feature may, if desired, be omitted from the embodiments of FIGS. 1, 2, 6, 7, 13, 14 and 18 and that the feature may be added in the embodiments shown in FIGS. 3, 4, 5, 9 and 19 or in any other embodiment having porous and fibrous web sheets within the foam core.

A sandwich panel 50 (FIG. 2) utilizes a reinforced foam core 52 which can be produced at improved rates of output compared to the embodiment shown in FIG. 1, because reinforcing struts need only be inserted into the foam core at a single angle, rather than at two opposing angles. Parallel fiber reinforced webs 51 extend between the faces of foam core 52 at an acute angle, for example 58 degrees or 45 degrees, to the faces of the core. The rows of webs 51 are intersected, generally at right angles, by a set of parallel rows of fiber reinforced struts 53, whose fibers extend through webs 51 and skins 54 in the manner described in connection with FIG. 1.

Figure 2:
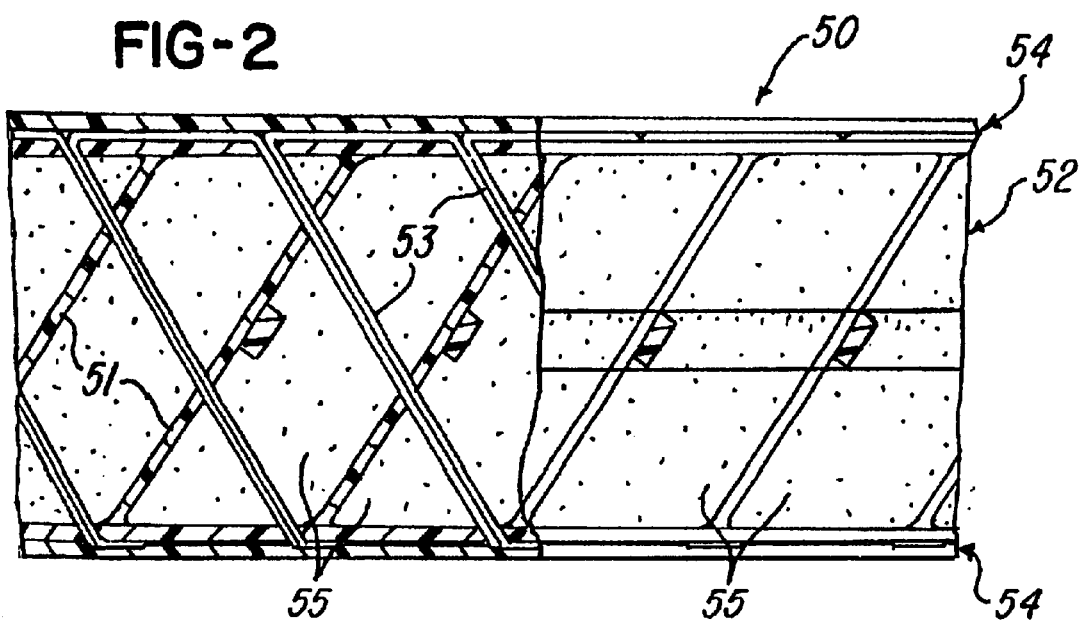
FIG. 2 is a fragmentary section of a reinforced foam core composite panel constructed in accordance with another embodiment of the invention.

In the embodiment shown in FIG. 2, all struts are inclined at an angle with respect to the panel skins, and the angle matches the angle of the webs 51 but in the opposite direction. Webs 51 and struts 53 support each other against buckling and cooperate to resist shear loads in one direction, and the webs also resist shear loads in the transverse direction. While any number of web reinforcement fabrics or mats may be selected, the dual direction structural function of the webs may be enhanced through the use of web reinforcing fabric having a portion of its fibers oriented at an angle opposing the angle of struts 53. Transverse shear strength may be efficiently achieved by orienting the remaining fibers of webs 51 at angles of +45 degrees and 45 degrees to the panel skins, since shear forces in the core resolve themselves generally into these angles.

The core reinforcing webs 34 of FIG. 1 and 51 of FIG. 2 terminate adjacent panel skins 32 and 54 respectively. Thus, the direct structural connection between webs and skins is provided by the adhesive bond of the resin matrix which surrounds all reinforcing fibers in the panel. The strength of this web-to-skin connection may by improved by providing the webs 34 and 51 with protruding and flared fibers at their edge portions or with web edge resin fillets formed by grooving foam strips 55 adjacent the edge portions of the webs, as described in U. S. Pat. No. 5,834,082.

The webs 34 and 51 also have an indirect structural connection with skins 32 and 54 through struts 35 and 53, respectively, which are attached to both webs and skins and thus carry a portion of the loads between webs and skins. Panel skins are also tied together by the configuration of the roving struts shown in FIG. 2, which comprise rows of continuous inclined separate staples each having flared strut end portions. The inclined staple form of strut construction may also be provided in panels having opposing struts and is more fully described in connection with FIG. 8.

If it is desired to increase further the strength and stiffness of composite panels having intersecting webs and struts, the core reinforcing webs may comprise a single, continuous fiber reinforced mat or fabric, rather than a plurality of discrete web strips. This embodiment is illustrated in FIGS. 3, 4 and 5. Referring to FIG. 3, composite sandwich panel 60 comprises fiber reinforced skins 61 and fiber reinforced foam core 62. The foam core 62 comprises foam pieces or strips 63, spaced rows of spaced fibrous roving struts 64, and a fibrous web sheet 65 which has been formed into a plurality of rectangular corrugations extending between the panel skins and transverse to the rows of struts. As in FIG. 1, struts 64 are inclined at equal opposing angles to the skins and intersect and extend through opposing struts and skins 61. The struts also intersect and extend through corrugated web segments 66, which extend between the skins and through web segments 67 which lie adjacent the skins. The architecture shown in FIG. 3 offers several structural enhancements to that shown in FIG. 1. Corrugated web segments 67 provide an expanded area of adhesive attachment to skins 61, and struts 64 provide a stitched mechanical attachment between web segments 67 and skins 61. Also, the corrugations of the web structure provide substantial additional strength and stiffness in the direction transverse to the rows of struts.

Reinforced sandwich panel 70, shown in FIG. 4, also provides the advantages of web-to-skin attachment and corrugation strength and stiffness described in connection with FIG. 3. In FIG. 4, foam strips 71 are of parallelogram cross section, and web segments 72 of a continuous corrugated web sheet 73 extend between the faces of the core 76 at an acute angle to skins 74. A plurality of parallel rows of spaced fibrous roving struts 75 also extend between the faces of the reinforced core 76, and the struts 75 are inclined at an angle equal to but opposing the angle of web segments 72. The struts intersect and extend through corrugated web segments 72, through web sheet segments 76 adjacent skins 74, and preferably extend through one or more layers of the skins. Fiber orientation in the webs may be optimized for overall core structural properties as more fully described in connection with FIG. 2. Also as in the case of FIG. 2, the orientation of the struts at a single angle permits rapid and efficient production of the reinforced core because only a single strut insertion step is required.

Another reinforced sandwich panel 80 shown in FIG. 5 and also employs a continuous corrugated web sheet 81 as part of the reinforcement of foam core 82. Foam pieces or strips 83 are triangular in cross section, and web segments 84 and 85, which extend between skins 87 are inclined at opposing angles to the skins. A plurality of rows of spaced fibrous roving struts 86 are inclined at equal but opposing angles to each other and intersect and extend through web segments 84 and 85. The struts also intersect and preferably extend through one or more layers of skins 87.

In contrast to the configurations shown in FIGS. 3 and 4, the triangulated web architecture of FIG. 5 provides substantial strength and stiffness to panel 80 both longitudinally and transversely, even in the absence of reinforcing struts 86. The struts enhance these properties by stabilizing web segments 84 and 85 and by tying skins 87 together. The struts 86 also provide additional strength and stiffness in the direction of the strut rows. The angle of the struts is selected on the basis of overall structural considerations and need not correspond to the angle of web segments 84 and 85. For example, the struts 86 may, if desired, be perpendicular to the skins. This not only provides increased compressive strength to panel 80, but also requires only a single angle of strut insertion, thus simplifying panel production.

FIGS. 6 and 7 illustrate a sandwich panel 90 having in the reinforced foam core 91 a plurality of parallel rows of spaced reinforcing roving struts 92, a plurality of intersecting parallel rows of spaced reinforcing roving struts 93, and a single continuous reinforcing web sheet 94 which is parallel to skins 95. Foam core 91 comprises stacked foam boards 96 separated by web 94. If required by structural design, struts 92 may differ from struts 93 in spacing, diameter, fiber composition and angle. Struts may be provided as a single set of parallel rows of struts if structural requirements of the panel are primarily unidirectional. Compressive and shear properties of panel 90 are provided primarily by struts 92 and 93. As the thickness of core 91 increases, or the diameter of the struts decreases, the struts are increasingly susceptible to buckling failure under structural load conditions. The struts 92 or 93 in each row intersect each other in a lattice-like configuration, providing buckling support for each other in the plane of the strut rows. However, only weak and often insufficient transverse buckling support is provided by the low density foam 96. The continuous fiber reinforced web 94, through which all of the struts 92 and 93 extend, provides the required additional buckling support. If needed, one or more additional support webs 94 may be provided, all spaced from each other and parallel to the panel skins 95.

FIG. 6 also shows strut end portions 97 and web edge portions 98 protruding from foam boards 96 to provide means of securing enhanced structural continuity between the reinforcing members of core 91 and the reinforcing members of adjacent foam cores molded as components of a single sandwich panel, or to other adjacent composite structures (not shown). If structural attachment of adjacent cores within a given sandwich panel is desired, edge portions of foam boards 96 and of foam boards of adjacent reinforced cores (not shown) are abraded or otherwise removed to expose fibrous strut end portions 97 and web edge portions 98, before introducing resin into the core and skin reinforcements. The reinforced cores are then pressed together, for example in a mold, and exposed end and edge portions from adjacent cores become intermingled and subsequently embedded in resin which is flowed into the panel reinforcements under differential pressure and cures to form a strong adhesive bond with strut end portions and web edge portions. Preferably, a strip of fibrous reinforcing mat or fabric extending between skins 95 is arranged in the mold between adjacent cores to enhance the load bearing properties of the joint between cores.

A strong structural connection between adjacent reinforced cores 31, or between cores 31 and sandwich panel edge skins, may also be achieved by providing cores 31 with fibrous webs 34 which extend beyond their intersection with the edges of core 31. The extensions of webs 31 are folded at right angles against foam strips 33 in the form of a tab. These web-end tabs provide an expanded area of contact for adhesively bonding the web reinforcing members to adjacent reinforcements when panel 31 is impregnated with resin. If it is desired to achieve a strong structural bond between a resin impregnated and cured panel 90 and an adjacent composite structure, foam boards 91 are abraded to expose stiff, hardened strut end portions 97 and web edge portions 98, and the area adjacent the end and edge portions is filled with adhesive resin, mastic or potting compound and pressed against the panel to which panel 90 is to be bonded while the resin cures.

The reinforced core 91 shown in FIGS. 6 and 7 has been provided with an integral resin infusion system, as generally described above in connection with FIG. 1. Sandwich panel 90 comprises porous and fibrous skin and core reinforcements and is placed in a closed mold from which air is evacuated. Resin is then introduced into feeder channel 99 at the end of the channel or through a hole drilled from the panel face (not shown). The resin then fills resin feeder channel 99, located within the interior of reinforced core 91, and fills connecting spaced resin grooves 100 located within the interior or core 91 and adjacent the porous and fibrous web 94. Resin then flows from grooves 100 throughout porous web 94, from the web 94 throughout porous struts 92 and 93, and from the struts throughout porous skins 95, after which the resin cures to form a structural panel. If the core 91 is to be used to produce a circular panel, resin grooves 100 may be arranged radially from the center of the panel and with the resin supplied from the panel face to the center.

The core reinforcement strut architecture shown in FIGS. 1, 3, 5, 6 and 7 takes the form of planar rows of opposing struts which intersect each other within the foam core. The number of such intersections and the density of the resulting lattice-like structure is dependent upon core thickness, the spacing between struts, and the steepness of the strut angle with respect to the panel skins. An alternate strut architecture is shown in FIG. 8 and may be substituted for that of FIGS. 1, 3, 5, 6 and 7, but is most appropriate in the case of relatively thin panels or relatively thick struts. The core reinforcing architecture of FIG. 8 comprises either unidirectional rows of struts, as shown, or sets of intersecting rows of struts and may be used with or without core reinforcing webs, depending upon structural requirements.

Referring to FIG. 8, a sandwich panel 110 comprises opposing skins 111 and reinforced foam core 112 having a plurality of rows of fibrous roving struts 113 which extend between panel skins 111 and which are inclined at equal but opposing angles to the skins. Opposing struts 113 intersect each other adjacent panel skins 111 in a simple triangulated configuration and extend through the skins. In the production of the reinforced core 110, continuous fibrous rovings 114 are stitched through skins 111 and foam core 112 from opposing faces of the foam core. If desired, both sets of roving struts may be stitched through the skins and foam core from the same face of the core. In the stitching process, continuous rovings 114 exit skins 111 and protrude in the form of loops 115 (shown in phantom). The rovings then double back along the line of insertion to form struts 113 comprised of double roving segments.

As the panel 110 advances through the stitching apparatus, roving segments 116 overlie the skins 111. Protruding roving loops 115 formed during the stitching process are severed at a desired distance, for example 0.2 inches, from the surface of the skins to form protruding strut end portions 117 (shown in phantom). When pressure is applied to the panel skins during the resin molding process, the protruding strut end portions 117 flare out and form flattened end portions 118 against the skins 111, forming a strong adhesive bond to the skins and a mechanical resistance to pulling flattened strut ends 118 through skins 111.

The mechanical attachment may be improved by the addition of outer skins as shown in connection with FIG. 1. Cut and flared strut ends 118 also provide substantially improved skin characteristics, compared to that achieved with intact loops, which tend to form lumps adjacent the skins or which prevent the panel from fitting tightly against the mold surface, allowing excess resin to accumulate at the skin surface. Surface flatness may be further improved by applying sufficient pressure to panel 110 to conform the foam core 112 to any roving segments which protrude beyond the surface of skins 111 or by providing the foam core with grooves or indentations into which protruding roving segments may be pressed under moderate molding pressure.

The inclined staple configuration comprising struts 113, cut and flared strut end portions 118, and roving segments 116 which overlie skins, as shown in FIG. 8, provides an efficient and effective means of securing structural attachment between core reinforcing struts and panel skins and a preferred method of producing all of the reinforced cores which are the subject of the present invention. It is understood that other methods of stitching and other treatments of roving segments which are exterior to the faces of the foam core may also be used, for example, conventional patterns of lock stitching or chain stitching of continuous fibers.

The sandwich panels and cores illustrated in FIGS. 1–8 typically have a width greater than their depth. Core reinforcing members comprising porous and fibrous webs and struts may also be incorporated into sandwich panels having a depth greater than its width. FIG. 9 illustrates a beam-type panel or beam 120 incorporating a strut-type core reinforcing architecture and designed for use as a roof support in corrosion resistant buildings. The beam 120 comprises opposing fiberglass or carbon fiber reinforced plastic skins 121, and a reinforced foam core 122 which comprises foam boards or pieces 123 and opposing porous fiberglass or carbon fiber reinforcing member struts 124 which extend through the foam core 122 at acute angles to the skins 121 in the general form of a bar joist. If required by structural design, additional struts may be added to intersecting struts 124 to form a lattice-like configuration, as illustrated in FIGS. 6 and 7, or one or more additional parallel rows of reinforcing struts may be incorporated into the panel or beam 120. Skins 121 function as structural chord flanges, the fibers of which are primarily oriented longitudinally. Skins 121 comprise inner skins 125 and outer skins 126 having fibrous reinforcements, with end portions 127 of the reinforcing members 124 flared and sandwiched between the skin layers as described in connection with FIG. 8. If desired, the skins 125 and 126 may be more strongly attached to the flared end portions 127, by stitching the skins to the end portions using flexible fibers or thin rigid rods which extend through the fibers of end portions 127 and adjacent skins 125 and 126.

One or more porous and fibrous support webs 128 may be incorporated into the beam 120 if required to stabilize the struts 124 against buckling under load. The faces of the foam boards 123 which extend between opposing skins 121 are provided with a second set of skins 129 of porous, fibrous reinforcing fabric, such as fiberglass, to stabilize beam 120 against lateral deflection under load. As previously described, a curable resin introduced under differential pressure impregnates all of the porous and fibrous reinforcing materials which form the beam 120 and cures to form a rigid, load-bearing beam. If required by structural considerations, the beam may be of non-uniform cross section, that is, varying in depth from beam ends to beam center, and may also be in curved or arch form. If desired, skins 120 may be substantially reduced in thickness, and the truss chord structural function may be provided by roving bundles inset in grooves in the foam boards adjacent the skins, as more fully described below in connection with FIG. 10.

The core reinforcing structure of sandwich panels in which panel width is greater than depth may take the form of a plurality of parallel true truss-type structures, in which rod- or strut-type reinforcing members extend at opposing angles in a triangulated configuration between top and bottom chord members, into which the end portions of the struts are anchored. This arrangement provides superior attachment of strut end portions. It also utilizes, as truss chord members, fibrous reinforcing materials, for example carbon fiber or fiberglass, in their relatively low cost roving form to replace a substantial portion of the more expensive fabric skin reinforcements. As shown in FIG. 10, a sandwich panel 140 comprises a reinforced closed-cell foam core 141 and opposing fibrous reinforcing skins 142. The reinforced core 141 is provided with a plurality of parallel rows of trusses 143 which extend between skins 142. Each truss 143 comprises parallel bundles of fibrous reinforcing rovings 144, such as fiberglass or carbon fiber, which are located in grooves formed in the foam core 141 and which serve as top and bottom chord members for each truss 143. Fibrous reinforcing rods or struts 145 penetrate the chord members and are anchored in chord members 143, and extend between panel skins 142 at opposing acute angles, preferably penetrating and overlying one or more layers of skins 142. A cured resin impregnates all of the reinforcing materials, as previously described. The truss structure, comprising struts 145 and chord members 143, may also be incorporated into cores having reinforcing webs which extend between or parallel to panel skins, as shown for example, in FIGS. 1 and 7.

Referring to FIG. 11, the use of relatively economical fibrous rovings in place of woven or knitted fibrous reinforcing fabrics may be extended to form the entire panel skin structure. A sandwich panel 150 comprises a reinforced closed cell foam core 151 and opposing fibrous skins 152. The core 151 comprises a foam board 153 and fibrous reinforcing members or struts 154 which extend between the skins. Each of the skins 152 comprises a first layer of parallel reinforcing rovings 155 adjacent the foam core 153 and substantially covering the faces of the foam. A second layer of parallel reinforcing rovings 156 overlie and cross first roving layer 155 and substantially covering the surface of first layer 155. If desired, a layer of fibrous mat or veil 157 may overlie second roving layer 156.

In the production of panel 150, the ends of the rovings which comprise first skin layer 155 are secured in a line across the leading edge of foam board 153. The board advances through stitching apparatus such as that shown in FIG. 15, and the forward motion of the board pulls the rovings to form the skin layer 155 from supply creels to cover the opposite faces of the board. Prior to the insertion of struts 154 by the stitching apparatus, a plurality of parallel skin rovings 156 are applied across first roving layer 155 by a reciprocating mechanism having guides which maintain the desired spacing and tension of the rovings 156. The second skin layer 156 is then covered by a fibrous veil 157 drawn from a supply roll. Core reinforcing struts 154 are stitched through the veil 157, the layers of skin rovings 156 and 155, and the foam board 153 to produce sandwich panel 150.

If required by structural considerations, additional layers of skin rovings may be applied to the panel faces at various angles before stitching. Alternately, oriented or non-oriented roving fibers may be chopped to desired lengths and applied to the core faces in lieu of continuous rovings. Overlying segments 158 of the stitched strut rovings 154 hold all of the skin rovings 155 and 156 in position until the panel 150 is placed in a mold where a curable or hardenable resin is flowed throughout all of the fibrous reinforcements to produce the structural panel. This method of forming panel skins directly from rovings may be incorporated into any of the embodiments shown in FIGS. 1–10.

In a preferred embodiment of the invention, substantial cost savings are achieved by producing the web-type core reinforcing members directly from fibrous rovings, rather than by using as the webs woven or stitched fabrics, which are significantly more expensive than rovings. In this method, rovings are wound circumferentially around a continuous foam strip to create a structural tube reinforcement structure around the strip. A particularly cost-effective means of forming the wound structure is by spiral or helical winding. The wound strip is cut to desired length and fed into a roving stitching machine in the manner described in connection with FIG. 15.

Referring to FIG. 12, plastic foam strips 170 of convenient length are fed end-to-end through a helical winding apparatus 171, illustrated diagrammatically. Helical winding of core reinforcements offers major economic advantages compared to existing processes. Fibers in roving form cost approximately 50- to 60-percent of those incorporated into double-bias 45-degree fabrics, and winding machine production rates are five to ten times those of braiding machines. If desired, the foam strip may be provided with one or more grooves 39 as described in connection with FIG. 1 to facilitate the flow of resin in a subsequent molding operation. The foam strip 170 has a thickness equal to the thickness of the sandwich panel core to be produced from the strip and a width equal to the desired spacing of reinforcing webs within the core.

As the strip 170 advances through the winding apparatus 171, it passes through the axes of a rotating bobbin wheel 172 rotating in one direction and a bobbin wheel 173 rotating in the opposite direction. Each wheel is loaded with a number of bobbins 174 wound with fibrous reinforcing rovings 175. Rotating bobbin wheel 172 winds a layer 176 of rovings onto the foam strip at a single angle which is determined by the rate of advance of strip 170 through the apparatus 171 and the rate of rotation of the bobbin wheel 172. The single-wound strip then advances through the counter-rotating bobbin wheel 173 which winds a second layer 177 of rovings over wound roving layer 176.

Winding apparatus 171 may be scaled to efficiently process a wide range of foam strip sizes, for example, from one-quarter inch to one foot or more in thickness. The rovings may be of different thicknesses and may be closely spaced, so as to cover the surface of the foam strip or more widely spaced, depending upon structural requirements of the finished wound strip and the composite panel into which it will be incorporated. Rovings applied to the surfaces of the foam strip may have a weight totaling as little as 0.1 ounces or less per square foot and as much as 5.0 ounces or more per square foot. The rovings shown in FIGS. 12–14 are thicker than normal, so that details of construction may be understood. The rovings may be wound at angles of +45 degrees and −45 degrees for maximum resistance to shear stresses in applications in which the strip is subjected to bending loads, or the rovings may be applied at other angles dictated by structural requirements of specific end products into which they will be incorporated.

The continuous foam strip 170 with overlying wound layers 176 and 177, is cut to length by a traveling cutting apparatus, such as a circular saw (not shown) to form finished wound strips 178. Since the wound foam strips 178 are used as the foam and web elements of a hybrid sandwich panel such as the one shown in FIG. 14, their length is equal to the desired width of the sandwich core panel. Prior to being cut, the wound rovings 174 are secured against unraveling, for example, by being wrapped on either side of the cut with yarn 179 impregnated with hot melt adhesive, or by applying adhesive tape around the cut location, or by applying adhesive to the rovings. If desired, foam strips 170 may be wound with a barrier film applied before the roving layers to protect the foam from moisture, resin attack or the like.

Figure 18:
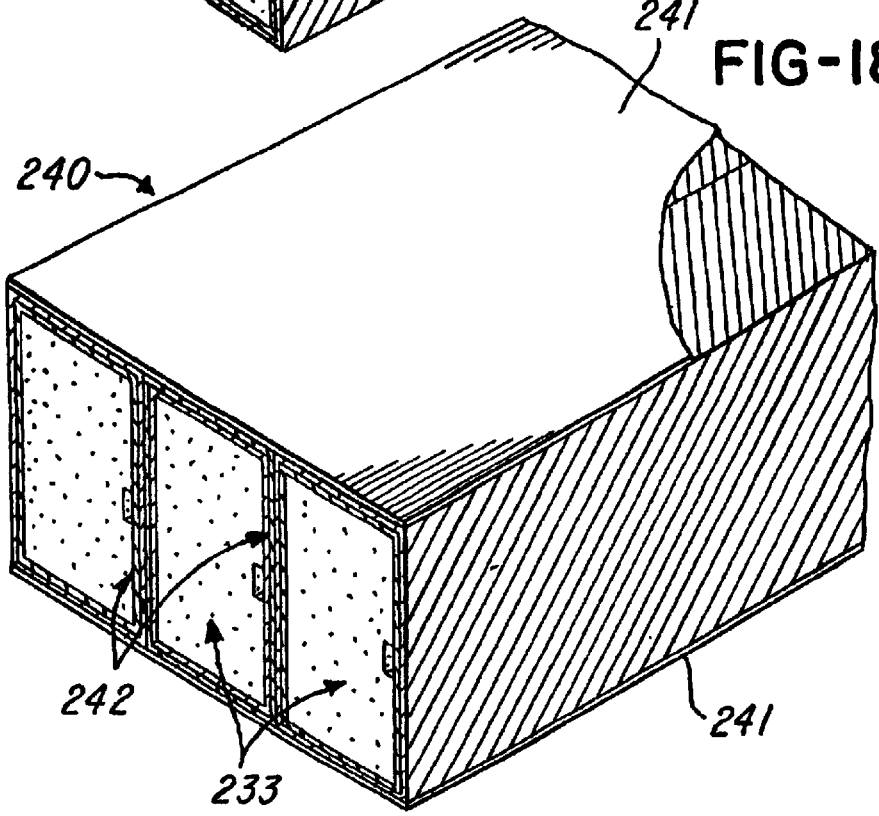
FIG. 18 is a fragmentary perspective view of a reinforced foam core constructed in accordance with the invention and using the component of FIG. 17.

Finished strips 178 are advanced to the infeed end of core forming apparatus 200 illustrated in FIG. 15 and are inserted into the apparatus as described in connection with FIG. 15, or are advanced into an apparatus (not shown) for attaching strips together with an adhesive veil 241, as shown in FIG. 18. Labor cost per square foot of core produced is very low. In a variation of the winding process described in connection with FIG. 12, a layer 180 of longitudinal fibrous rovings is applied to the surface of the foam strip 170, in a direction parallel to the longitudinal axis of the strip and prior to rovings 174 being wound around the strip so that the layer 180 is held in place by the wound rovings 174. The rovings of longitudinal layer 180 are supplied from stationary roving packages 181 and are pulled through winding apparatus 171 by the forward motion of the advancing foam strip 170. The longitudinal rovings may be applied to two opposing faces of the strip, as shown in FIG. 12, to serve as sandwich panel skin elements as will be described in connection with FIG. 14. Alternately, the longitudinal rovings may be applied to all faces of the foam strip in order to provide compressive and buckling properties required for structural columns.

FIG. 13 provides a detailed view of a wound foam strip 178, showing the layering and orientation of the four sets of porous and fibrous rovings applied during the winding process illustrated in FIG. 12. In FIG. 13, all rovings are shown as having flat cross section and are closely spaced to cover the surface of closed cell plastic foam strip 170. The longitudinal roving layers 180 cover the top and bottom faces of foam strip 170. The first layer 176 of wound roving, shown at an angle of +45 degrees, covers longitudinal roving layers 180 and the side faces of the foam strip 170. The second layer 177 of wound rovings, at an angle of −45 degrees, covers the first wound layer 176. When subsequently impregnated with a curable thermosetting resin or hardenable thermoplastic resin, all of the fibrous rovings, along with the cured or hardened resin, produce a structural element having the general properties of a beam of rectangular tubular cross section.

FIG. 14 illustrates a reinforced foam core sandwich panel of the intersecting web and strut hybrid construction described above in connection with FIG. 1, but in which the roving-wound strips 178 shown in FIG. 13, are substituted for the foam strips 33 with the attached web sheets 34 shown in FIG. 1. Additionally, FIG. 14 incorporates rovings in place of woven or knitted fabrics to form the sandwich panel skins, in the production method shown in FIG. 15. This combination of roving-wound foam core strips and roving-applied panel skins provides important structural and cost advantages.

Referring again to FIG. 14, a structural composite panel 190 comprises a fiber reinforced closed cell plastic foam core 191 and opposing fiber reinforced skins 192. The reinforced foam core 191 comprises a plurality of parallel strips 178 shown in FIG. 13. If desired, foam strips 178 may be provided with diagonally wound rovings in only one direction by alternating right hand and left hand wound strips while forming the sandwich panel core, so that adjacent wound edges are at plus and minus angular orientation, rather than both with the same orientation and therefore structurally unbalanced.

The wound foam strips 178 are intersected at right angles by a plurality of parallel rows of spaced rods or struts 193 which extend between the faces of the core, and are made up of porous and fibrous reinforcing rovings. The struts 193 within each row are inclined at opposing acute angles to each other, to the panel skins 192, and to the plane surfaces of the wound strips 178. Overlying the wound strips 178 is a layer of parallel porous and fibrous skin rovings 194 which extend in a direction parallel to the plane of the rows of struts 193 and perpendicular to the wrapped strips 178 and their longitudinal rovings layer 180. A light weight fibrous veil, mat or scrim 195 overlies the skin roving layer 194 which may be applied to the panel 190 in the form of either a plurality of discrete rovings or as a unidirectional fabric having rovings adhered in advance to a light weight veil. The end portions of the struts 193 penetrate all layers of longitudinal rovings 180, wound rovings 176 and 177, skin rovings 194 and veil 195, and these end portions overlie veil 195.

Figure 15:
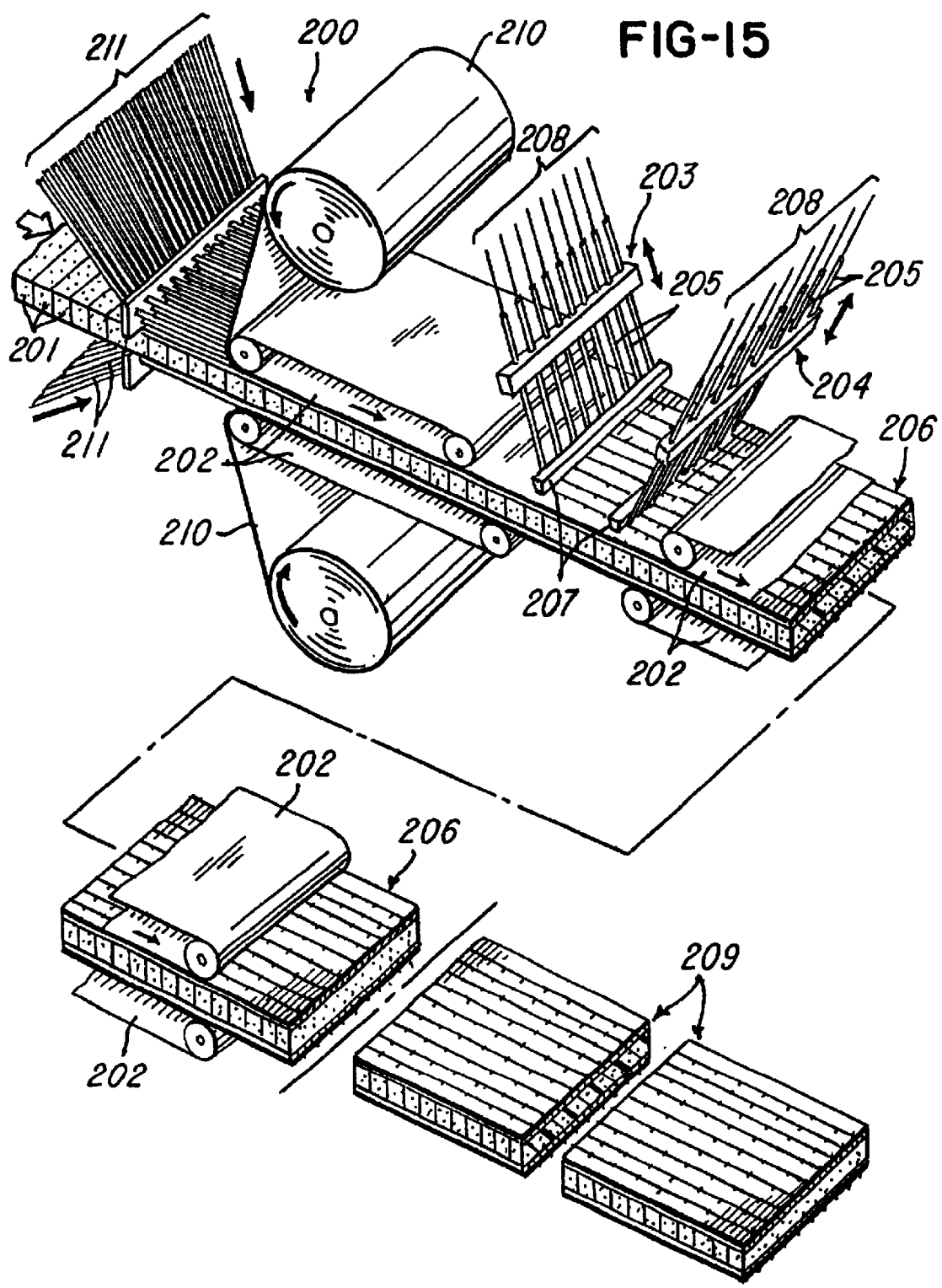
FIG. 15 is a diagrammatic view of apparatus for producing fiber reinforced foam core panels in accordance with the invention.

The panel illustrated in FIG. 14 has been inverted from the position in which it is produced in the apparatus of FIG. 15 in order to show the continuous rovings which comprise the struts 193. As shown in FIG. 14, a plurality of continuous rovings have been stitched through sandwich panel 190 at opposing angles and from the same side of the panel, with each continuous roving segment 196 interlocked with itself in a chain stitch configuration. It is understood that alternate stitching methods may be used, for example lock stitching or cut loops as shown in FIG. 1.

An important feature of the fibrous reinforcing structure shown in FIG. 14 is that the longitudinal roving layer 180 on the wound strips 178 comprises the transverse reinforcements of the sandwich panel skins 192, and the +45 degrees and −45 degrees roving layers 176 and 177 which overlie longitudinal layer 180 also constitute elements of the sandwich panel skins. That is, the web elements of the core reinforcements are comprised of the same continuous wound rovings as the +45 degrees and −45 degrees skin elements. This results in greater resistance to delamination between core and skin structure, since the web-type core reinforcing webs do not terminate adjacent the panel skins as in FIG. 1. The roving layers 180, 176 and 177, which cover foam strips 178, also anchor the end portions of struts 193.

Reinforced core 190 shown in FIG. 14 may also be produced omitting the roving layers 180 and 194 and veil 195, which comprise skin elements continuous across the length and/or width of the panel. This may be desirable when the reinforced cores are used to produce large sandwich panels, for example boat hulls, which generally consist of a plurality of cores adjacent one another and between the skins of the panel. In such panels, it is generally preferred to use skins of sufficient length and width to provide structural continuity across a number of cores, rather than to use cores having pre-attached skins, whether such pre-attached skins comprise reinforcing fabrics or of rovings integrated into the core as described in connection with FIG. 14. When continuous skin elements 180, 194 and 195 are omitted, the wound strips 178 remain tightly held together as a unitized core by the friction of strut rovings 193 which intersect adjacent cores and by the continuous strut roving segments which are stitched along the top and bottom faces of strips 178. In this configuration, the end portions 196 of struts 193 do not extend through the skins of the sandwich panel, but rather are trapped between the wound outer roving layer 177 and the panel skins applied to the surface of the core.

The roving-wound foam strips 178 of FIGS. 12–14 are shown as rectangular in cross section. If desired, these strips may be of other cross sections, for example, parallelogram or triangular, as shown in FIGS. 4, 5 and 19.

U.S. Pat. No. 5,904,972 discloses sandwich panel core elements comprised of discrete plastic foam blocks or strips wrapped with reinforcing fabrics. A plurality of the wrapped blocks are stacked between sandwich panel skins in a mold in honeycomb configuration, with the end portions of the foam blocks and edge portions of the wrapped fabric adjacent the panel skins. The helically wound foam strips 178 shown in FIG. 13 of the present application may be substituted for these wrapped blocks to provide comparable structural properties at substantial savings over the cost of fabrics and the labor of fabrication.

As described in U.S. Pat. No. 5,904,972, it may be desirable to extend the edge portions of the reinforcing fabric beyond the ends of the foam blocks, so that they may be folded over to form a flange for improved structural attachment to the sandwich panel skins. A similar extension of the wrapped and longitudinal roving layers 180, 176 and 177 of FIG. 13 may be achieved by alternating sacrificial foam blocks (not shown) end-to-end with core foam strips 170, winding the foam as described above, cutting the wrapped strips through the middle of the sacrificial foam blocks, and removing the sacrificial blocks. Foam strips 170 may also be provided with surface microgrooves prior to insertion into winding apparatus 171. Other suitable core materials may be substituted for the plastic foam used for the wound strips or blocks, for example balsa wood or hollow, sealed plastic bottles of similar geometric shape.

Since the structural properties of the sandwich panel cores shown in FIGS. 1–19 are usually provided primarily by the fibrous core reinforcing structure, the closed-cell plastic foam which comprises the cores may be selected on the basis of other desired panel properties, such as water or fire resistance, thermal insulation or light transmission. For example, translucent polyethylene foam and fiberglass reinforcing materials may be impregnated with translucent resin to produce a light-transmitting and load bearing panel for use as the roof of highway trailers or building roofs. It is also within the scope of the invention to substitute for the plastic foam other cellular materials, such as carbon foam or balsa wood.

FIGS. 1–8, 10, 11 and 14 illustrate fiber reinforced cores and sandwich panels which are produced in part by inserting, or stitching, porous and fibrous reinforcing elements such as fiberglass rovings through the thickness of foam plastic core materials. This may be accomplished by the apparatus 200 illustrated in FIG. 15. A plurality of foam strips 201 are inserted adjacent one another into stitching apparatus 200. Strips 201 may be of rectangular or other cross section and may be provided with attached porous and fibrous webs of reinforcing fabric or with wound porous and fibrous reinforcing rovings, as previously described. It is understood that, if desired, foam boards having a length substantially greater then the width of strips 201 may comprise the foam plastic material.

The strips 201 are advanced in generally equal steps by, for example, a reciprocating pressure bar (not shown) or movable endless belts 202, to stitching heads 203 and 204, to which are rigidly attached a plurality of tubular needles 205, cannulae or compound hooks, adapted for piercing and for inserting fibrous rovings. Stitching heads 203 and 204 are inclined at opposing acute angles to the surface of strips 201. When the strips 201 stop advancing at the end of each forward step, the reciprocating stitching heads 203 and 204 insert the needles 205 into and through the strips 201. The needles are accurately positioned at their points of entry into strips 201 by needle guides 207. The porous and fibrous rovings 208, which have been supplied from wound roving packages (not shown), are inserted by the needles 205 through the strips 201 and emerge on the surface opposite their points of entry in the general form of the loops 115 as shown in FIG. 8.

Referring again to FIG. 15, the loops 115 are gripped by apparatus (not shown) which retains the loops formed beyond the surface of the strips from which they have emerged and, if desired, engages them with other loops to form a chain stitch as shown in FIG. 14 or with separately supplied rovings to form a lock stitch. The stitching heads 203 and 204 then retract, which advances into the needles 205 a predetermined length of rovings 208 sufficient to form the next stitch. After retraction, the row of strips 201 advances a predetermined step or distance and stops, and stitching heads 203 and 204 reciprocate to insert the next pair of opposing struts. The unitized assembly of strips 201 held together by stitched rovings 208 which intersect the strips, is cut by a saw or other suitable means into cores 209 of desired length.

The stitching apparatus 200 may be used to produce panels 209 having pre-attached porous and fibrous skins as shown in FIG. 1. Referring again to FIG. 15, reinforcing skin fabric 210 is supplied from rolls and advances adjacent the opposing faces of the panel 206 to stitching heads 203 and 204. As rovings are stitched through the strips 201 which form the panel 206, the rovings overlie the skin fabric 210 and mechanically attach the fabric 210 to panel 206.

The apparatus 200 shown in FIG. 15 may also be used to produce sandwich panels in which all structural reinforcing components of both core and skins comprise low cost fibrous rovings, as shown in FIG. 14. A layer of longitudinal skin rovings 194 (FIG. 14) is applied as the surface of panel 206 during its production in the stitching apparatus 200 shown in FIG. 15. A plurality of porous and fibrous rovings 211 sufficient to cover the faces of the panel are pulled by the advancing panel 206 from roving supply packages (not shown) and advance adjacent the exposed faces of strips 201 to the stitch heads. A thin, porous veil, mat or scrim 210 is pulled from rolls by the advancing panel 206 to overlie skin rovings 211 and hold them in place after the rovings 208 have been stitched through panel 206. The strips 201 have been provided with a longitudinal roving layer 180, as shown in FIG. 14, so that layers 180 and 194 of FIG. 14 comprise the transverse and longitudinal skin reinforcements of panel 206 produced in FIG. 15. It is also within the scope of the invention to provide panel producing apparatus 200 with a reciprocating mechanism (not shown) which applies transverse and double-bias angle rovings to the faces of panel 206. This permits the production of the panels 150 shown in FIG. 11, in which the foam core does not comprise wound strips 178 containing roving layer 180.

Figure 16:
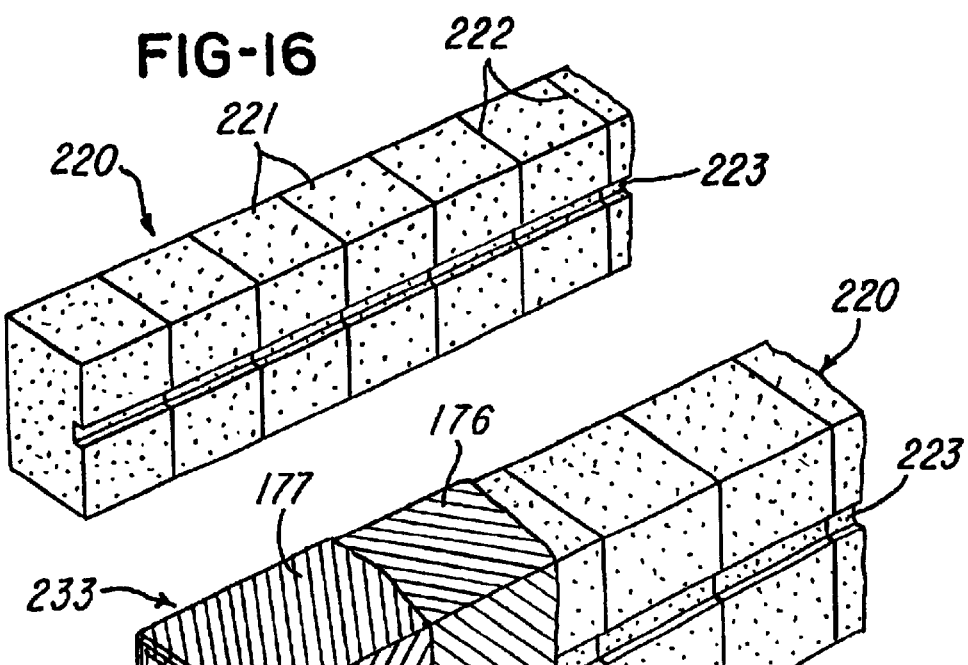
FIG. 16 is a fragmentary perspective view of a reinforced foam component constructed in accordance with the invention.

In another preferred embodiment of the present invention, bi-directional panel strength is achieved by providing wound foam strips 177 with internal transverse reinforcing members, rather than by inserting structural rovings 193 through the strips 177. Referring to FIG. 16, reinforced foam strip 220 comprises a plurality of blocks or pieces 221 of foam plastic separated by sheets 222 of web-like fibrous reinforcing material, such as fiberglass or carbon fiber fabric or mat. Foam pieces 221 and reinforcing webs 222 are adhesively connected to each other for ease of processing and handling, while maintaining substantial porosity of the web material, as described in U. S. Pat. No. 5,834,082. Reinforced strip 220 may be provided with a groove 223 for the flow of resin. It is understood that other materials may be substituted for foam pieces 221, for example balsa wood or plastic blow-molded cubes, without compromising the form or structural integrity of the core.

Figure 17:
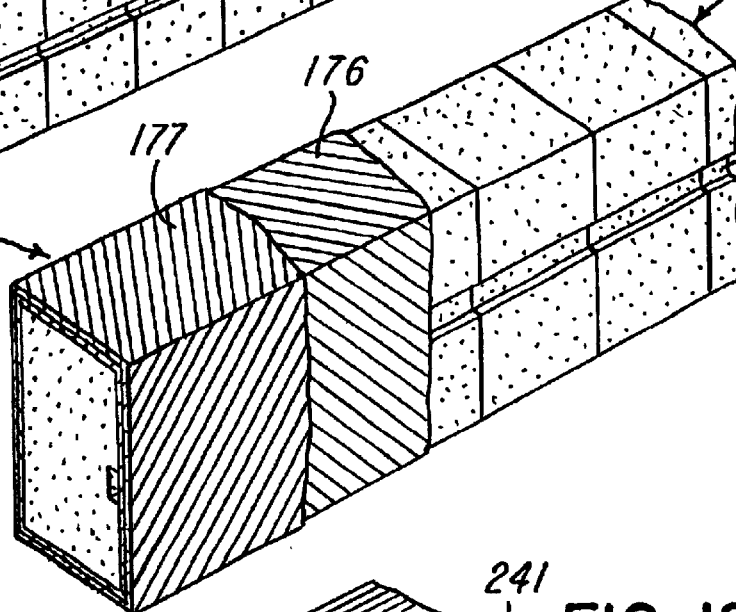
FIG. 17 is a fragmentary perspective view of a reinforced foam component using the component of FIG. 16.

Referring to FIG. 17, reinforced strip 230 is provided with layers 176 and 177 of fibrous rovings, as shown in FIGS. 12 and 13, to form wound reinforced strip 233. If needed for increased bending or axial strength, roving layer 180 shown in FIG. 13 may also be provided. Referring to FIG. 18, reinforced core 240 is comprised of a plurality of wound reinforced strips 233 held together as a unitized structure by veils 241 adhered with heat activated binder to opposite faces of core 240. If desired for greater bending flexibility, veil 241 may be applied to only one surface of the core. Other means of unitizing the core structure include adhering parallel bands of hot melt yarn or scrim across the wound strips or applying pressure sensitive adhesive to the faces of the strips which are in contact with each other. In lieu of veils 241, structural skin fabric or mat may be adhered to the core surface to form a sandwich panel preform ready for impregnation. When one or more cores 240 is placed in a mold between fabric skin reinforcements and resin is flowed throughout the core and skin structure and cured to form a structural composite panel, fabric webs 222 and roving webs 242 comprised of four wound roving layers 176 and 177 form a grid-like reinforcing structure, and the portions of wound layers 176 and 177 adjacent the panel skins provide exceptional adhesive attachment for resistance of shear forces. The articulated construction of core 240 also permits a high degree of conformability to curved mold surfaces.

FIG. 19 illustrates an embodiment of a fiber-wound core 250 in which bi-directional strength and stiffness are achieved without the addition of either internal webs or roving struts. Fiber reinforced core 250 comprises a plurality of triangular foam strips 251 which have been provided with layers 252 and 253 of helically fibrous rovings to form wound strips 254. The wound triangular strips 254 are held together as a unitized core structure by veils 255 adhered with a heat activated binder to outer wound roving layer 253 of wound strips 254. The angles to which the triangular strips 251 are cut may be selected for the desired balance of shear and compressive strength.

It is within the scope of the present invention to use either of two general types of hardenable resin to infuse or impregnate the porous and fibrous reinforcements of the cores and skins. Thermoset resins, such as polyester, vinyl ester, epoxy and phenolic, are liquid resins which harden by a process of chemical curing, or cross-linking, which takes place during the molding process. Thermoplastic resins, such as polyethylene, polypropylene, PET and PEEK, which have been previously cross-linked, are liquefied by the application of heat prior to infusing the reinforcements and re-harden as they cool within the panel.

As an alternate to infusion of the porous reinforcement materials of the assembled panel structure with liquid resin, the reinforcing materials may comprise fabrics and rovings which have been pre-impregnated with partially cured thermoset resins which are subsequently cured by the application of heat. Similarly, reinforcing roving and fabric materials may be pre-impregnated with thermoplastic resins or intermingled with thermoplastic fibers which are subsequently fused together through the application of heat and pressure.

It is further within the scope of the invention to bond to the faces of the reinforced foam cores rigid skin sheet materials such as steel, aluminum, plywood or fiberglass reinforced plastic. This may be achieved by impregnating the core reinforcements with a curable or hardenable resin and applying pressure to the rigid skins while the resin cures, or by impregnating and curing the core reinforcement structure prior to bonding rigid skins to the core with adhesives.

While the forms of the reinforced foam cores herein described and their method of construction constitute preferred embodiments of the invention, it is to be understood that the invention is not limited to these precise forms and method steps and that changes may be made therein without departing from the scope and spirit of the invention.

What is claimed is:

1. A fiber reinforced core adapted for infusion with a hardenable resin and having opposite core surfaces adapted to be attached to corresponding skins, said core comprising plastics foam material forming said core surfaces, a plurality of rows of reinforcing struts extending between said opposite core surfaces, each of said struts comprising porous and fibrous rovings enclosed by said foam material, and said struts having cut and flared end portions overlying at least one of said core surfaces.

2. A core as defined in claim 1 and including skins of porous and fibrous material adjacent said opposite core surfaces, and said end portions of said rovings extend through said skins.

3. A core as defined in claim 1 wherein said rows of struts extend at acute angles relative to said core surfaces.

4. A core as defined in claim 1 wherein adjacent said rows of struts cross within said core.

5. A core as defined in claim 1 and including grooves within said foam material along said opposite core surfaces, and ravings extending within said grooves and receiving said flared end portions of said struts.

6. A core as defined in claim 1 wherein said rovings include a heat activated adhesive resin.

7. A core as defined in claim 1 wherein said strips comprise translucent foam material and including translucent skins overlying said core surfaces.

8. A fiber reinforced core panel adapted for use with a hardenable resin and having opposite core surfaces adapted to be attached to corresponding skins, said core panel comprising a plurality of elongated strips of low density cellular material, adjacent said strips having opposing faces within an interior of said core panel between said opposite core surfaces, webs of fibrous material separating said opposing faces of said adjacent strips and extending between said opposite core surfaces, portions of said webs being exposed at said opposite core surfaces, a plurality of rows of reinforcing struts extending between said opposite core surfaces at an acute angle relative to said webs and extending through said webs at locations spaced from said core surfaces, said struts comprising fibrous rovings enclosed by said strips, and said webs and the intersecting said struts cooperating to resist buckling of said webs and said struts within said strips under loading for substantially increasing the strength of a structural panel incorporating said core panel.

9. A core panel as defined in claim 8 and including skins of porous and fibrous material adjacent said opposite core surfaces, and said rovings also extend through said skins.

10. A core panel as defined in claim 8 wherein said webs and said rovings include a heat activated resin.

11. A core panel as defined in claim 8 wherein each of said webs is disposed at an acute angle relative to said core surfaces.

12. A core panel as defined in claim 8 wherein said webs are integrally connected and form a continuous corrugated pattern in cross-section through said strips.

13. A core panel as defined in claim 8 wherein said webs comprise portions of fibrous rovings helically surrounding each of said strips along the length thereof.

14. A core panel as defined in claim 13 and including generally parallel and continuous fibrous rovings extending longitudinally along said strips adjacent said helically surrounding rovings.

15. A core panel as defined in claim 8 wherein each of said strips has a generally triangular cross-sectional configuration.

16. A core panel as defined in claim 8 and including resin distribution grooves extending internally within said strips and spaced from said core surfaces and intersecting said webs and the intersecting said struts for supplying resin to said core surfaces through said webs and said struts.

17. A core panel as defined in claim 16 and including at least one skin having inner and outer layers of porous and fibrous material, and a resin barrier film of adhesive material between said layers.

18. A core panel as defined in claim 8 wherein said strips comprise translucent foam material, and including translucent skins overlying said core surfaces.

19. A core panel as defined in claim 8 and including at least one internal sheet of porous and fibrous material extending within said core generally parallel to said opposite core surfaces, and said struts extend through said sheet.

20. A fiber reinforced core panel adapted for use with a hardenable resin and having opposite core surfaces adapted to be attached to corresponding skins, said core panel comprising a plurality of elongated strips of low density cellular material, a first layer of fibrous ravings continuously and helically surrounding each of said strips along the length thereof, a second layer of fibrous rovings continuously and helically surrounding said first layer on each said strip along the length thereof, said rovings in said second layer extend helically in an opposite direction and crossing said rovings in said first layer, said elongated strips and said helically surrounding rovings are connected together to form a unitized said core panel with said ravings extending over said core surfaces for receiving the skins and adapted to be moved as a preform unit to a molding process where the resin is hardened.

21. A core panel as defined in claim 20 and including generally parallel continuous fibrous rovings extending longitudinally along each of said strips adjacent a layer of helically extending rovings.

22. A core panel as defined in claim 20 wherein each of said strips of material has generally a triangular cross-sectional configuration.

23. A core panel as defined in claim 20 wherein the elongated strips and surrounding rovings are connected together prior to hardening the resin by skin members overlying said core surfaces.

24. A core panel as defined in claim 20 and including a plurality of rows of stitched rovings forming reinforcing struts extending between said opposite core surfaces, and said struts are enclosed by said strips.

25. A core panel as defined in claim 24 wherein said strips have parallel spaced grooves within said core surfaces, and said stitched rovings extend within said grooves.

26. A core panel as defined in claim 20 wherein said rovings include a heat activated resin.

27. A core panel as defined in claim 20 wherein said rovings are porous for receiving a hardenable adhesive resin.

28. A core panel as defined in claim 27 and including internal resin distribution grooves extending within said strips and spaced inwardly from said opposite surfaces and intersecting said rovings between said strips for supplying resin to said core surfaces through said ravings.

29. A core panel as defined in claim 28 and including at least one skin having inner and outer layers of porous and fibrous material, and a resin barrier film of adhesive material between said layers of said skin.

30. A core panel as defined in claim 20 wherein said strips comprise translucent foam material and including translucent skins overlying said core surfaces.

31. A core panel as defined in claim 20 and including at least one internal sheet of fibrous material extending within each of said strips generally parallel to said opposite core surfaces.

32. A core panel as defined in claim 20 and including longitudinally spaced internal transverse reinforcing members extending laterally within each of said strips and to said core surfaces.

33. A core panel as defined in claim 20 wherein adjacent said rovings are spaced from each other.

34. A core panel as defined in claim 20 and including generally continuous fibrous ravings extending laterally across said strips.

35. A core panel as defined in claim 20 and including skins of preformed substantially rigid sheet material.

36. A fiber reinforced core panel adapted for use with a hardenable resin and having opposite core surfaces adapted to be attached to corresponding skins, said core panel comprising a plurality of elongated strips of low density cellular material, a layer of fibrous rovings continuously and helically surrounding each of said strips along the length thereof, said elongated strips and said helically surrounding rovings are connected together to form a unitized said core panel, said rovings extending continuously over said opposite core surfaces to substantially increase the area of resin bond between said rovings and the skins, said rovings also extending completely through the thickness of said core panel between said strips to tie the skins together, and said core panel being movable as a unit to a molding process where the resin is hardened.

37. A core panel as defined in claim 36 and including a second layer of fibrous rovings continuously and helically surrounding the first said layer on each said strip along the length thereof, and said rovings in the second said layer extend helically in an opposite direction and cross said rovings in the first said layer.

38. A core panel as defined in claim 36 wherein all of said rovings surrounding each said strip extend helically in the same angular direction, and said rovings on each said strip cross said rovings on each laterally adjacent strip.

39. A core panel as defined in claim 36 wherein each of said strips of material has generally a triangular cross-sectional configuration.

40. A core panel as defined in claim 36 wherein the elongated strips and surrounding rovings are connected together prior to hardening the resin by skin members overlying said core surfaces.

41. A core panel as defined in claim 36 and including a plurality of rows of stitched rovings forming reinforcing struts and extending between said opposite core surfaces, and said struts are enclosed by said strips.

42. A core panel as defined in claim 41 wherein said strips have parallel spaced grooves within said core surfaces, and said stitched rovings extend within said grooves.

43. A core panel as defined in claim 36 wherein said rovings include a heat activated resin.

44. A core panel as defined in claim 36 wherein said rovings are porous for receiving a hardenable adhesive resin.

45. A core panel as defined in claim 44 and including internal resin distribution grooves extending within said strips and spaced inwardly from said opposite surfaces and intersecting said ravings between said strips for supplying resin to said core surfaces through said rovings.

46. A core panel as defined in claim 45 and including at least one skin having inner and outer layers of porous and fibrous material, and a resin barrier film of adhesive material between said layers of said skin.

47. A core panel as defined in claim 36 wherein said strips comprise translucent foam material and including translucent skins overlying said core surfaces.

48. A core panel as defined in claim 36 and including at least one internal sheet of fibrous material extending within each of said strips generally parallel to said opposite core surfaces.

49. A core panel as defined in claim 36 and including longitudinally spaced internal transverse reinforcing members extending laterally within each of said strips and to said core surfaces.

50. A core panel as defined in claim 36 wherein adjacent said ravings are spaced from each other.

* * * * *